United States Patent
Lai

(10) Patent No.: US 12,506,854 B2
(45) Date of Patent: Dec. 23, 2025

(54) OBJECT POSITIONING SYSTEM AND METHOD FOR NEAR-EYE DISPLAY

(71) Applicant: Oomii Inc., Grand Cayman (KY)

(72) Inventor: Jiunn-Yiing Lai, New Taipei (TW)

(73) Assignee: Oomii Inc., Grand Cayman (KY)

( * ) Notice: Subject to any disclaimer, the term of this patent is extended or adjusted under 35 U.S.C. 154(b) by 0 days.

(21) Appl. No.: 19/000,929

(22) Filed: Dec. 24, 2024

(65) Prior Publication Data

US 2025/0220149 A1 Jul. 3, 2025

Related U.S. Application Data

(60) Provisional application No. 63/615,550, filed on Dec. 28, 2023.

(51) Int. Cl.
| | |
|---|---|
| *H04N 13/246* | (2018.01) |
| *H04N 13/117* | (2018.01) |
| *H04N 13/239* | (2018.01) |
| *H04N 13/254* | (2018.01) |
| *H04N 13/271* | (2018.01) |

(52) U.S. Cl.
CPC ......... *H04N 13/246* (2018.05); *H04N 13/117* (2018.05); *H04N 13/239* (2018.05); *H04N 13/254* (2018.05); *H04N 13/271* (2018.05)

(58) Field of Classification Search
CPC .. H04N 13/246; H04N 13/117; H04N 13/239; H04N 13/254; H04N 13/271
See application file for complete search history.

(56) References Cited

U.S. PATENT DOCUMENTS

| | | | |
|---|---|---|---|
| 11,666,825 B2 * | 6/2023 | Delamont | G06T 19/006 463/32 |
| 2016/0033770 A1 | 2/2016 | Fujimaki et al. | |
| 2020/0107013 A1 | 4/2020 | Hudman et al. | |
| 2023/0296898 A1 * | 9/2023 | Lai | G06V 10/16 345/8 |
| 2024/0046575 A1 | 2/2024 | Xiong | |

OTHER PUBLICATIONS

Extended Search Report dated Oct. 16, 2025, issued for the counterpart European application No. 25175271.3.

* cited by examiner

*Primary Examiner* — Richard T Torrente
(74) *Attorney, Agent, or Firm* — Chen Yoshimura LLP

(57) ABSTRACT

A near-eye display system, comprising a first imaging device and a second imaging device, for respectively capturing a first image and a second image of a surrounding environment, the first image device and the second imaging device being provided at different spatial locations, wherein the first image and the second image comprise an image of an real object, a first spatial coordinate of the real object is determined based on bitmap unit pair receiving the image of the real object, the bitmap unit pair corresponds to at least two positions respectively on image sensors of the first imaging device and the second imaging device, wherein the first spatial coordinate of the real object is transformed to a second spatial coordinate based on a relative position of the user to the first imaging device and the second imaging device.

18 Claims, 17 Drawing Sheets

| Virtual binocular Pixel | pair of designated location | Spatial coordinate (horizontal, vertical, depth) |
|---|---|---|
| BP1 | R(11), L(11) | h1, v1, d1 |
| BP2 | R(11), L(11) | h2, v2, d2 |
| . | . | . |
| . | . | . |
| . | . | . |
| BP216 | R(66), L(66) | h216, v216, d216 |

OBJECT POSITIONING SYSTEM AND METHOD FOR NEAR-EYE DISPLAY

BACKGROUND OF THE INVENTION

Field of the Invention

The present invention pertains to a novel method and system for positioning real objects in an augmented reality environment. Specifically, it relates to a real-time object positioning method and system that significantly enhances both latency and accuracy compared to conventional positioning systems.

Description of Related Art

Simultaneous Localization and Mapping (SLAM) is a cornerstone technology for augmented reality (AR) applications, enabling devices to understand and interact with their environment by building a map while simultaneously determining their location within it. SLAM is essential for creating immersive AR experiences, as it allows virtual objects to be accurately placed and anchored in the physical world. However, implementing SLAM in AR applications presents several significant challenges.

One of the foremost challenges is the need for real-time processing in dynamic environments. AR applications often operate in environments filled with unpredictable factors, such as changing lighting conditions, moving objects, or complex surfaces like glass and mirrors that can distort sensor data. These variations can lead to inaccuracies in the mapping process, causing virtual objects to appear incorrectly placed or misaligned. In an ideal SLAM system, the device must continuously update its map and localization to account for environmental changes. However, processing the large amounts of visual and depth data required for this, especially in complex or changing environments, can overwhelm even advanced algorithms, leading to delays and inaccuracies.

Another challenge is that SLAM requires intensive calculations, involving the simultaneous analysis of data from multiple sensors, including cameras, gyroscopes, and accelerometers. Mobile AR devices, such as smartphones and AR glasses, often lack the computational power of high-end computers. Balancing the need for accurate SLAM performance with the limited processing capabilities of these devices is a significant hurdle. While improvements in processors and machine learning algorithms have helped, real-time SLAM on lightweight devices remains difficult. Optimization of algorithms to improve efficiency without sacrificing accuracy is a continuing area of research, but it still lags behind the demand for seamless AR experiences.

Finally, power consumption presents an ongoing challenge. AR applications utilizing SLAM require continuous sensor input, high-frequency data processing, and display rendering, all of which place significant strain on the battery life of mobile devices. Ensuring that SLAM operates efficiently without rapidly draining battery life is essential for AR applications to be practical in everyday use. Efforts to develop energy-efficient SLAM algorithms and specialized hardware are ongoing, but power consumption remains a key limitation, especially for mobile Near-eye display and smartphones.

Given the current challenges with SLAM technology, the aforementioned factors make it difficult for SLAM to perform effectively in real-world scenarios.

SUMMARY

The present invention is proposed for replacing traditional SLAM technology. The present invention works by converting the view angle of cameras into the user's perspective and, by using the user's left and right eye viewpoints to assess the distance of objects in the real environment, the actual spatial coordinates of each object in the image can be determined.

In the present invention, the camera's view is transformed into left and right eye's perspectives for the user. By analyzing the relative position of the same object in each eye's field of vision and the orientation of the eyes, the direction of the line of sight for both eyes can be determined. The position in real space of the object is then calculated based on where the two sightlines intersect; thereby addressing real-time localization and mapping issues of the traditional SLAM system and enabling precise distance and location display when the object is moving.

In an embodiment, the depth coordinate perceived by the user in the real space of each of the binocular pixels having a specific horizontal coordinate and vertical coordinate is rendered by projecting the right light signal and the left light signal to a pair of retina designated location pairs respectively on surface of the right retina and the left retina. Each pair of retina designated location pairs renders a specific depth coordinate (and horizontal and vertical coordinates as well) perception for the user. The vertical coordinate or the horizontal coordinate perceived by the user in the real space of the at least one binocular pixel of the virtual image are also rendered by projecting the right light signal and the left light signal to a pair of retina designated location pairs on surface of the right retina and the left retina having vertical positions or horizontal position corresponding to the vertical coordinate or the horizontal coordinate.

In one embodiment, a look-up table may be constructed to quickly identify the correct designated location pair for rendering a depth coordinate at specific vertical and horizontal coordinate for a binocular pixel. For displaying a binocular pixel at a specific 3-dimensional coordinate in real space, the light signals projected into the left eye and the right eye of the user need to be received at the corresponding designated locations on the surface of the retinae of the user based on the information of the look up table.

In one embodiment, the spatial location of an object or a portion of an object is determined based on the addresses or coordinates on the image sensors which receive the images of the object. In some instances, each portion of the real object may have different spatial coordinates; therefore, the image of the real object may be received by a plurality of bitmap unit pairs, each bitmap unit pair from the plurality of bitmap unit pairs corresponds to different portion of the real object and represents different spatial coordinates.

In some embodiments, the present invention may further comprise a object identification module for identifying an specific object from the images captured by a plurality of cameras. The object identification module is able to identify the pixel value changes in the image sensors so as to track the shift in pixel coordinates of the image of the target object, thereby, identify the coordinates of the image cells (or pixels) which are receiving the image of the target object at a given moment. Once the coordinates of the image cells (or pixels) receiving the image of the target object are known, the bitmap unit pairs receiving the image are also known; in turn, the spatial location of the object can be determined.

In one embodiment, a table comprising the information of each bitmap unit pair and the corresponding spatial coordinate (x,y,z) can be constructed. The origin of the spatial coordinate system may be set relative to the user's position or relative a vehicle carrying the image devices. Meanwhile, another table comprising the information of the each retina designated location pair and the corresponding spatial coordinate (x,y,z) can also be constructed. Thereby, the mapping/conversion between bitmap unit pair and retina designated location pair can be performed. However, before the mapping/conversion, there are several factors needed to be considered for successful conversion or mapping the bitmap unit pair to the retina designated location pairs. Since the cameras are positioned differently with respect to the user's eyes, the view angles and the coordinate of the captured images is not the same as the view angles of the eyes of the user; as a result, a coordinate transformation and pixel interpolation is needed to fit the view angles of the cameras images into the view angles of the left eye and right eye of the user.

In some embodiments, it is possible to combine method for determining a spatial location of an object and the method for rendering a pixelized image with depth together, to facilitate superimposition of a virtual image onto a real object. Each pixel represents the image of a small portion of the real object, and each small portion of the real object has a unique spatial coordinate. For rendering a virtual object superimposed onto a portion of a real object, the near-eye display system projects the light signal of each of the pixels of a virtual image onto the selected desired retina designated location pairs on the retinae which can render the binocular pixels having the same spatial coordinates in 3D real space as the corresponding bitmap unit pairs, thereby, creating an accurate superposition of the virtual image onto the real object relative to the conventional method.

In one embodiment, the invention may further include an object recognition module to identify objects in images captured by first and second imaging devices, such as cameras. When a user wears the near-eye display system while driving, the object recognition module can help identify potential hazards to prevent accidents.

In one embodiment, the near-eye display system further comprises a positioning module for determining the position of the user relative to a reference coordinate system. The near-eye display system can superimpose images, such as arrows, to guide the user to maneuver in traffic in real-time to reach the designated location. The object recognition module can help identify potential hazards and obstacles to avoid potential hazards. The superimposed image will be at the same depth as the actual object, such as the allay to take turn, allowing the user to accurately perceive the correct direction to go.

In one embodiment, the present invention is related to the following method:

Step S901: An initial calibration is performed to obtain parameters related to the driver's interpupillary distance (IPD) and depth perception for both near and far viewing distances. By using the field-of-view parameters of AR glasses, a viewer's space mapping table is established to map retina designated location pairs to corresponding actual spatial coordinates (e.g., using the midpoint between the eyes of the viewer as the origin) within the left and right eye view images;

Step S902: Obtain position information of the cameras and driver and construct a view angle coordinate transformation model based on the information;

Step S903: Construct the pixel mapping table;

Step S904: By utilizing a pixel mapping table, the images captured from the camera's perspective are converted into images corresponding to the driver's left and right eye perspectives;

Step S905: Using image recognition to locate the object that require information labeling, and then finding the corresponding retina designated location pair representing the positions of these points in the left and right eye views; and Step S906: Lookup the actual coordinate information of the object from a mapping table (imaging device space mapping table) which contains the relationship between bitmap unit pairs and the corresponding 3D coordinate and superimpose virtual image onto the object.

BRIEF DESCRIPTION OF THE DRA WINGS

DETAILED DESCRIPTION OF PREFERRED EMBODIMENTS

Figure 1:
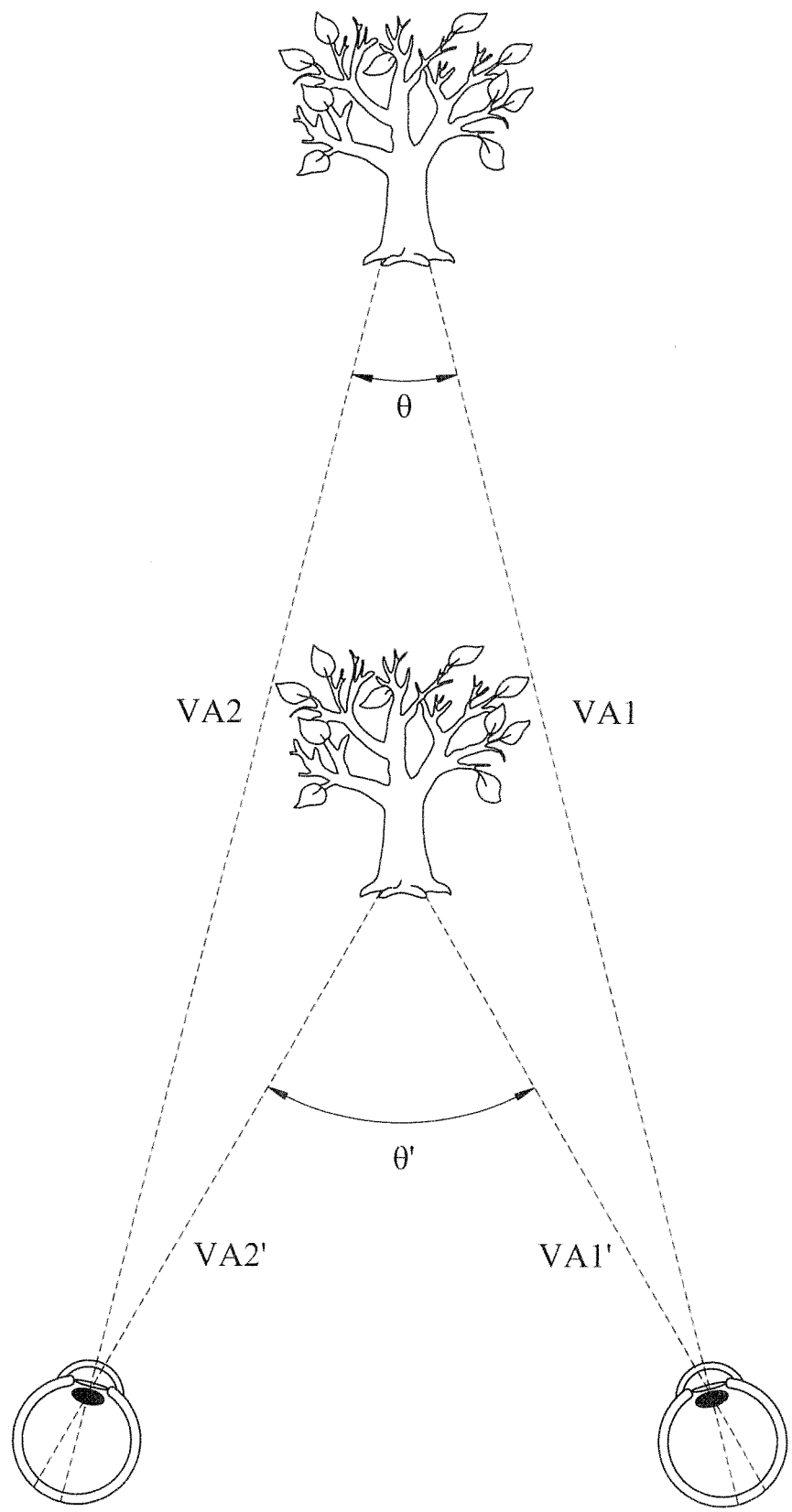
FIG. 1 illustrates the principle of nature of binocular vision.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

In the present invention, a light signal is used for rendering a monocular pixel (namely, a pixel for the left or right eye). In some embodiments, a light signal may be a light pulse, or a short burst or packet of light that lasts for a finite amount of time. The light pulse can contain a broad range of wavelengths depending on its duration. The monocular pixel projected to the left eye and the monocular pixel projected to the right eye are fused by the human brain to create a binocular pixel. In some embodiments, a plurality of monocular pixels for the left eye may render a left monocular image frame; and a plurality of monocular pixels for the right eye may render a right monocular image frame. When the user fuses the left monocular image frame and the right monocular image frame together, the user perceives a binocular image frame.

This disclosure presents a method for three-dimensional (3D) binocular virtual image imaging with depth. The term "fixate" refers to the binocular vision where a user's visual axes attempt to converge at the location of a viewed object, allowing the user to perceive the object's image. In this specification, the visual axis is the line connecting a fixation point to the central fovea of the macula through the pupil. Generally, when a user fixates on an object, the crystalline lens and ciliary muscle make adaption so the user can perceive the object's image clearly. In the present invention, it is designed such that when the user's eyes fixate on a part of the 3D binocular virtual image, the location of intersection of the visual axes of the two eyes and the location of intersection of the optical path extensions (such as left and right light signals) forming said part of the 3D binocular virtual image are substantially the same. This ensures that the depth of the 3D binocular virtual image perceived by the user matches the depth coordinates of the fixation point in real space, thereby avoiding vergence-accommodation conflict (VAC) and focal rivalry. Moreover, since the perceived coordinate location of the 3D binocular virtual image in physical 3D space matches the location of the user's binocular fixation, when the user touches this location with a part of the hand (e.g., the index fingertip or both the thumb and index finger), they can simultaneously fixate on and see both the hand and the 3D binocular virtual image at the same physical location. This enables more realistic interaction between virtual and real objects without the need for additional auxiliary media.

In this disclosure, the term "light convergence angle" or "optical convergence angle" refer to the angle between optical paths or optical path extension of a first incident light signal and a second incident light signal (such as a left light signal and a right light signal), and the term "convergence angle" refers to the angle between the visual axes of a user's eyes.

For the convenience of describing the present invention, for example, each location in space is represented by three-dimensional (3D) coordinates, such as the XYZ coordinates. In other embodiments, a different 3D coordinates system can be used. Therefore, each virtual binocular pixel has 3D coordinates in a horizontal direction, a vertical direction, and a depth direction. The horizontal direction (or X-axis direction) is the direction along the interpupillary line. The vertical direction (or Y-axis direction) is the direction along the facial midline and perpendicular to the horizontal direction. The depth direction (or Z-axis direction) is orthogonal to the frontal surface, and orthogonal to the horizontal and vertical directions.

The principle of presenting a binocular virtual image and enabling the user to see the virtual image at specific 3D coordinates in the 3D physical space in accordance with this embodiment of the disclosure will be described below. Later on, the principle for detecting the 3D coordinate of a real object in real space with optical camera in accordance with the novel method of the present invention will also be described.

With reference to FIG. 1, according to the nature of binocular vision, when the user perceives an object, the eyes of the user fixate at the object and the visual axes (denoted as VA1, VA2; and VA1', VA2') of both eyes points toward said object. The visual axis is a line extending from the viewed object through the center of the pupil to the yellow spot of the retina. The depth perception for human is partially dependent upon the convergence angle $\theta$ between the two visual axes (VA1, VA2; and VA1', VA2') of the eyes. When the eyes turns toward said object, the yellow spot of the retina can directly receive light from said object, thereby perceive a clear image of the object. That is to say, when the convergence angle between the two visual axes of the eyes (when fixating at an object) is relatively larger ($\theta$'), then the object may be perceived as relatively closer to the user (smaller depth); on the other hand, when the convergence angle between the two visual axes of the eyes (when fixating at an object) is relatively smaller ($\theta$), then the object may be perceived as relatively farther away from the user.

Figure 2:
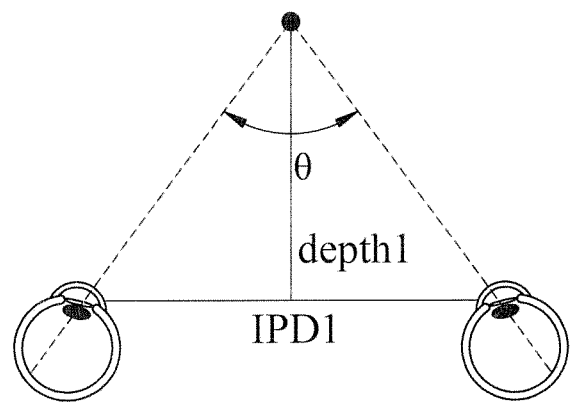
FIG. 2 illustrates the principle of nature of binocular vision.
Figure 2:
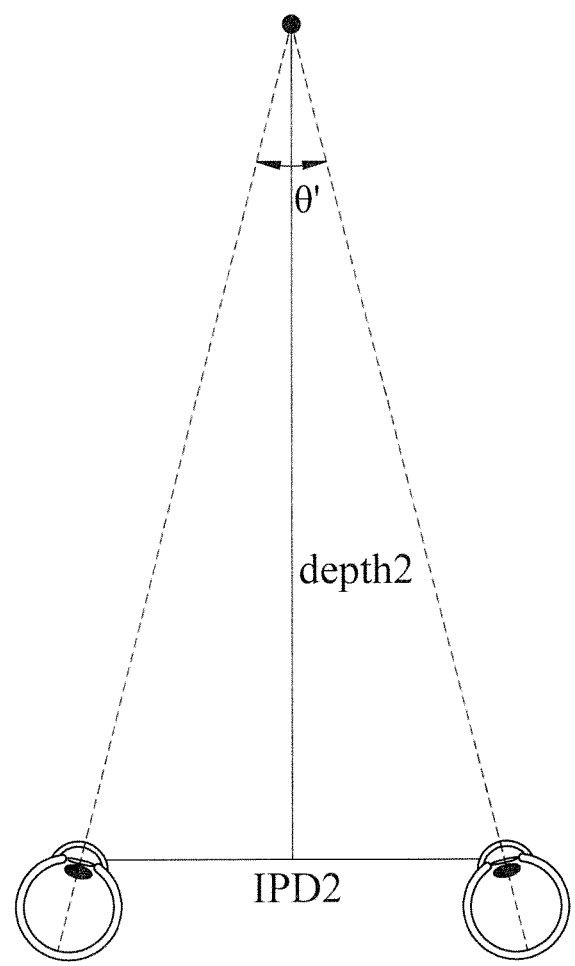

As mentioned, the actual convergence angle is measured based on the visual axes, which is extended from the center of the pupils of the eyes to the object fixated by the user; however, the locations of the pupils change when the eyes fixate at objects with different depths (please refer to FIG. 2). As shown, the interpupillary distance IPD1 and IPD 2 (IPD1<IPD 2) of a user is non-constant (which is referred as "variable interpupillary distance" in the present discloser) and varies according to the convergence angle $\theta$ of the visual axes (or angle of rotation of the eyes). Therefore, a calibration process for determining the convergence angles of the eyes and the respective IPD for every user when the user fixate on an object having various depth is needed. By knowing what is the correct convergent angle needed for a specific user to perceive an real object at specific depth, we can use this information to accurate create virtual image to have depth perception for the specific user. In general, when human fixates at object that are sufficiently far away from the user, the visual axes of the two eyes are substantially parallel to each other. Generally, the convergence angle of the visual axes is defined to be at 0 degree when the visual axes are parallel to each other. When the object has a depth coordinate relatively closer to the user, the convergence angle between the visual axes increases. However, due to the anatomy of the human eyes, there is a maximum convergence angle which can be reached by the human eyes. The maximum convergence angle corresponds to the maximum amount of rotation which the eyeballs can achieve. This also corresponds to the minimum distance in depth direction which the eyes can fixate.

Figure 3:
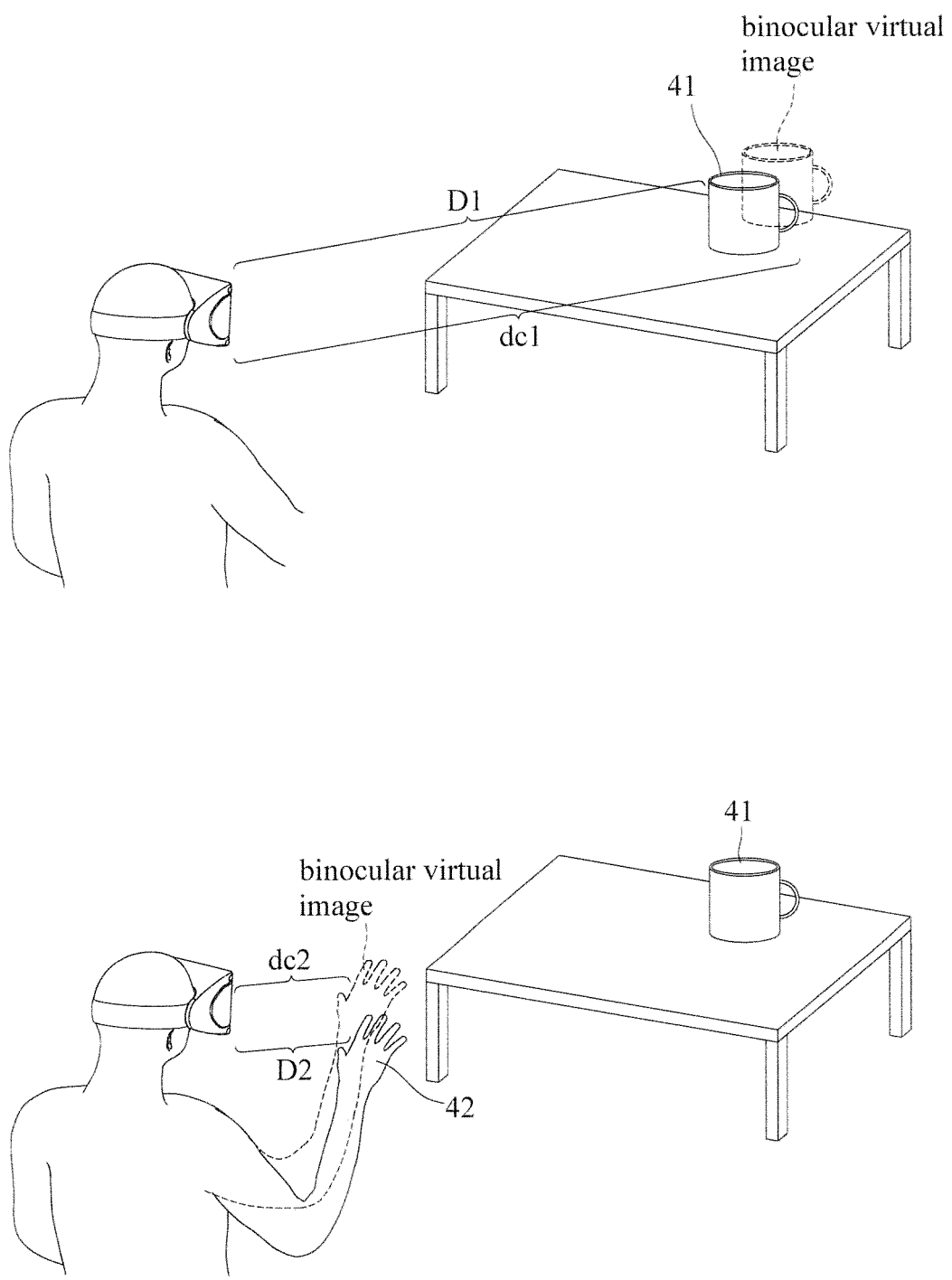
FIG. 3 illustrates the calibration process of the near-eye display system.

With reference to FIG. 3, as an example, in accordance with one embodiment of the present invention, for the process of convergence angle and IPD calibration, a first object 41 (real object) in the environment is chosen such that when the user fixates at the first object 41, the convergence angle between the two eyes is closest to being parallel to each other. The distance of the first object 41 relative to the user can be determined by conventional range sensing mechanism. Meanwhile, a second object 42 (also real object) in the environment is chosen such that when the user fixates at the second object 42, the convergence angle between the two eyes is closest to the maximum convergence angle achievable by the eyes of the user. The distance of the second object 42 relative to the user can also be determined by conventional range sensing mechanism.

However, in some other embodiments, the first object 41 and the second object 42 can be chosen according to the maximum displaying limit of the near-eye display system in the physical 3D space. More specifically, in many instances, the near-eye display system has a maximum limit (in terms of distance from the user) for rendering a virtual image in horizontal direction, vertical direction, and depth direction. The spatial range within the maximum limit for rendering a virtual image in horizontal direction, vertical direction, and depth direction is call an area of effective display in the present invention. The first object 41 can be chosen close to the maximum displaying limit of the near-eye display system in the depth direction, which is farthest away from the user in the area of effective display. Yet in other embodiments, when the near-eye display system is used indoor, the first object 41 can be chosen such that the first object 41 is farthest away from the user in the depth direction within the indoor space. In any cases, the first object 41 is chosen such that when the user fixates at the object, the visual axes are as close to parallel as possible. As for the second object 42, it is chosen such that when the user fixates at the second object 42, the convergence angle between the two eyes is closest to the maximum convergence angle achievable by the eyes of the user. When there is no object in the environment close enough to create the maximum convergence angle of the visual axes, the user may be asked to hold an object in front of the user; and the object is designated to be the second object 42. That is to say, the first object 41 is the object furthest away from the user within the area of effective display for the near-eye display system, and the second object 42 is the object closest to the user within the area of effective display for the near-eye display system.

Once the first depth D1 and the second depth D2 are determined, the calibration process proceeds. With reference to FIG. 3 again, the near-eye display system emits a binocular virtual image at a position intended to match the first object 41 with a first depth coordinate dc1 at a first instant according to a set default parameter of the near-eye display system. The user may be asked to provide feedback regarding whether the binocular virtual image is perceived to have the same depth as the first object 41. Further in some embodiments, the user may be asked to provide feedback related to altering the first depth coordinate dc1 perceived by the user (i.e., moves the binocular virtual image forward and backward in the course of trying to match the first object 41). The user may adjust the rendered first depth coordinate dc1 of the binocular virtual image to substantially match the first depth D1 according to his/her perspective while fixating at the first object 41. The optical convergence angle for generating the binocular virtual image substantially matching the first depth D1 according to the perception of the user is then recorded when the user has finished adjusting the depth coordinate of the binocular virtual image. A first interpupillary distance (IPD1) is then calculated or measured when the first depth coordinate dc1 is substantially the same as the first depth D1 relative to the user. By the same token, at a second instant, the same calibration process is performed for the second object 42 to and the second depth coordinate dc2. The second interpupillary distance (IPD2) is then calculated or measured when the first depth coordinate dc2 is substantially the same as the second depth D2 relative to the user. With the data obtained by the aforementioned calibration process, a relation between the convergent angle versus depth perception for a particular user can be obtained. In the meantime, the corresponding relation between the convergent angle versus IPD for the user can also be known. The methods for obtaining the relations between depth perception, convergent angle, and IPD of a particular user are merely exemplary methods, other alternative methods for obtaining the relations can be utilized in different embodiments of the present invention. Using these result, the depth coordinate in physical space at which the user fixate upon can be determined with eye-tracking device. Specifically, the eye-tracking device can detect the convergent angle and IPD of the user at a specific moment and determine the depth perception (or a specific depth coordinate) which the user is having.

The following summarizes the process flow for calibrating the accuracy of depth rendering for a binocular virtual image in accordance to an embodiment of the present invention, the steps described hereafter can be executed in any order without deviating from the scope of the present discloser:

Step 1: Adjusting the near-eye display system to allow all light signals emitted by the emitters enter the pupils of the user and forms image on the retina of the user. For example, the user can make adjustment to the position of the near-eye display system one eye at a time and the other, until to make sure the light signals perceived by the user can be fused to create a single binocular virtual image.

Step 2: (determining the first IPD): calculate the first IPD when the user perceives that both the binocular virtual image and the first object 41 have the same depth. The depth of the first object 41 is measured by the first distance measuring device (e.g., ranging (depth) camera), the first IPD of the user is calculated based on the depth and the optical convergence angle of between the first and second collimated light signals 91 and 92. The user or the system of the near-eye display system may select a first object 41 which is the furthest away from the user within the area of effective display or within the effective range of the first distance measurement unit 10. For examples, the first object 41 may be a wall, a closet or any larger objects. The binocular virtual image may be something substantially flat, such as a 2D image (e.g., a picture or a paper like object). In the set of default parameters, the default IPD may be set as, for example 65 mm; the occlusion effect of the binocular virtual image may be created based on this IPD prior to calibration. As mentioned earlier, the user can use the occlusion effect created by the head wearable system to know at which depth the heard wearable display considers that the binocular virtual image and the first object 41 have the same depth according to the default setting (or the set of default parameter). The user can adjust the depth coordinate of the binocular virtual image so as to let the binocular virtual image and the first object 41 to have the same depth, as mentioned earlier. The first IPD can then be calculated based on the depth coordinate of the binocular virtual image (or the first depth D1 of the first object 41) adjusted by the user and the optical convergent angle of the first and second collimated light signals 91 and 92 for two eyes.

Step 3: (determining the second IPD): For determining the second IPD, the user may be asked to select an object that is closest to the user within the area of effective display or within the effective range of the first distance measurement unit 10. In one instance, the user may be asked to raise his/her finger (e.g., index finger) in front of the user as the second object 42 and fixate at the finger. The user can move the finger as close to the eyes as possible while maintaining fixation at the finger and fusion of the vision. The first distance measurement unit 10 may determine the distance (in the depth direction) between the user and the finger. The near-eye display system then emits a binocular virtual image that has the same depth as the second object 42 (the finger) according to the set of default parameter. As mentioned earlier, the user can use the occlusion effect created by the near-eye display system to know at which depth the heard wearable display considers that the binocular virtual image and the first object 41 have the same depth. The user can adjust the depth coordinate of the binocular virtual image so as to let the binocular virtual image and the second object 42 to have the same depth, as mentioned earlier. The second IPD can then be calculated based on the depth coordinate of the binocular virtual image adjusted by the user and the optical convergent angle of the first and second collimated light signals 91 and 92. At later, the occlusion effect can be rendered based on the users feedback and adjustment.

Step 4: Calibrating the set of default parameters (which includes the parameters for depth coordinate rendering and the corresponding optical convergence angle for the first and second collimated light signals 91 and 92) with the measured IPD1, IPD2, as well as the calculated IPD($\theta$) to create a new set of parameters (calibrated) according to the previously mentioned methods. A look-up table containing the information of depth perception of a particular user verses the optical convergent angle needed (or emission angle). The look-up table may also contain information of the relationship between the variation of interpupillary distance and the first depth coordinate dc1 or the second depth coordinate dc2 for the user. Furthermore, in some instances, a personalized virtual space map can be created based on the new set of parameters. The virtual space map may contain information such as the boundary of the binocular fusion area (top, bottom, left, right, and front boundaries) or the field of vision boundary for a single eye.

It is well known that the horizontal and vertical coordinates of an object or virtual image perceived by a user depend on the horizontal and vertical locations on the retina where light from the object or virtual image is received. The present invention addresses the fact that the depth coordinate in 3D space of the object or virtual image perceived by the user is correlated with the interpupillary distance (IPD) and the convergence angle of the user's visual axes when fixating on the object or virtual image. Furthermore, the invention addresses that the depth coordinate in 3D space of the object or virtual image perceived by the user is also correlated with the horizontal locations on the retina where light from the object or virtual image is received. Geometrically, the IPD (the distance between the two pupils of the eyes, in some cases, associated with the horizontal distance between the two pupils) and convergent angle of the eyes when the user fixating on an object or virtual image can be used to calculate the horizontal locations on the retinae where the image of the object or virtual image is received.

Figure 4:
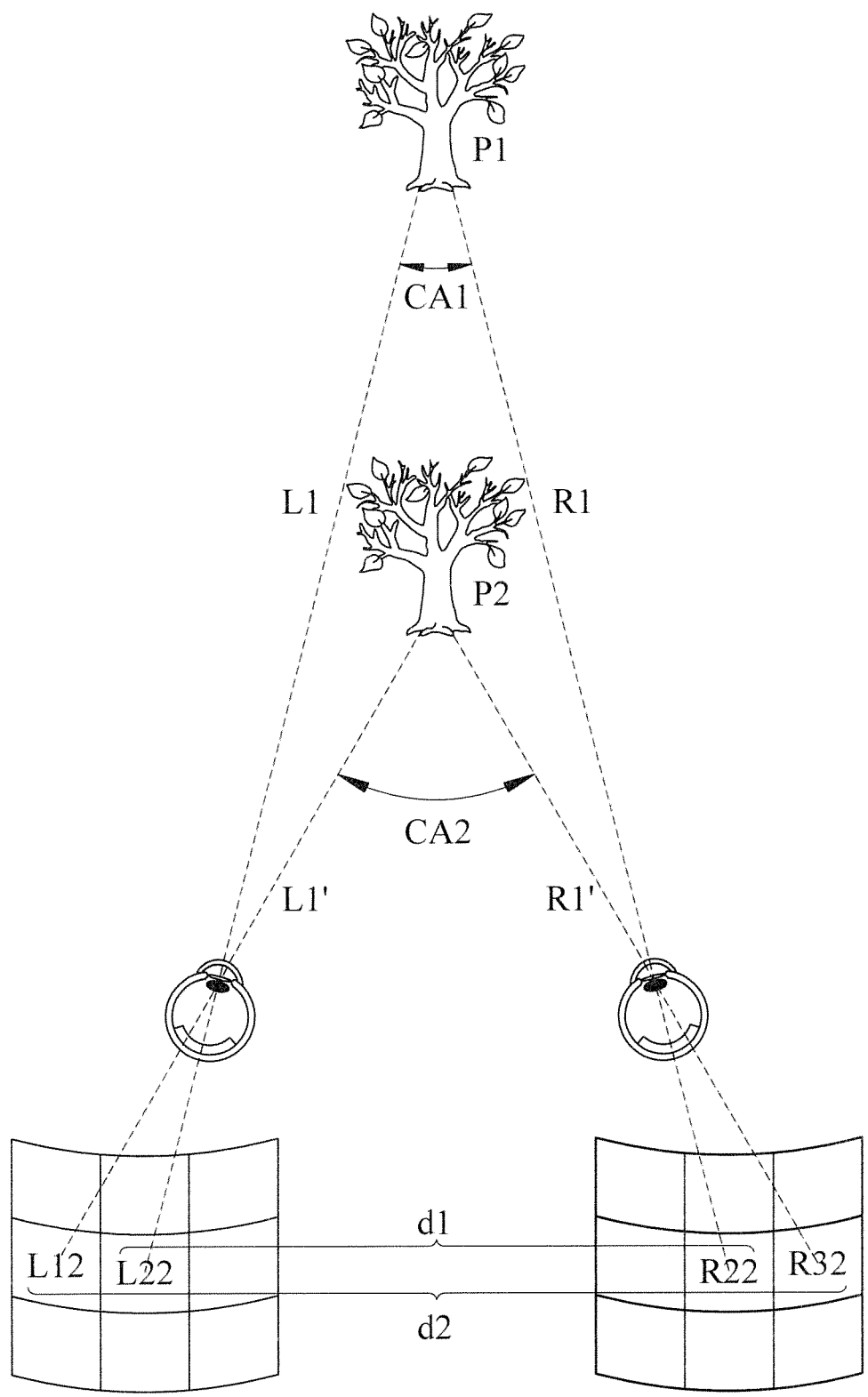
FIG. 4 illustrates the principle of rendering 3D perception of a binocular pixel in accordance to the present invention.

With reference to FIG. 4, which illustrates the principle of perception of the horizontal, vertical and depth position of an object in 3D space according to the present invention. For the convenience of illustrating the principle of human vision and retina scanning, the locations/regions of retina of the right eye and the left eye of the user are drawn as matrixes, each of the matrix elements correspond to a specific horizontal and vertical location on the retina. For simplicity, only 6 matrix elements are drawn for each eye. According to the present invention, the right light pixel R1 from the image (containing a plurality of pixels) arrives at matrix element R22 of the right retina. The corresponding left light pixel L1 from the image arrives at matrix element L22 of the left retina. As aforementioned, when the depth of the image perceived by the user increases, the convergence angle decreases; conversely, as the depth of the image perceived by the user decreases, the convergence angle increases. Specifically, as shown in FIG. 4, suppose the image is moved from a position p1 to p2, the convergence angle changes from CA1 to CA2 (with CA2>CA1); meanwhile, the location on the right retina receiving the right light pixel changes from R22 to R23, and the location on the left retina receiving the left light pixel changes from L22 to L12. Evidently, the depth perception of an image is related to the horizontal coordinates where the right light pixel and the left light pixel received by the retinae. Furthermore, according to FIG. 4, it can be seen that each convergence angle formed between the first light pixel R1 and the second light pixel L1 has a corresponding relative horizontal distance between the first light pixel R1 and the second light pixel L1 on the two retinae (shown as d1 and d2). Thus, it can also be regarded that the depth of image perceived by the user is correlated to the relative horizontal distance between the location where the first light pixel R1 is projected on the right retina and the corresponding location where the second light pixel L1 is projected on the left retina. In other words, the deeper an image is perceived by the user, the smaller the relative horizontal distance between the location on the retina for receiving the right light signal and the location on the retina for receiving the left light signal. Furthermore, from another aspect, the relative distance between the first light pixel and the second light pixel can also be associated with the horizontal coordinate on the retina where the first light pixel R1 and second light pixel L1 are received. Based upon the principle above, the depth perception of an image can be manipulated by varying the relative distance between the light pixels forming the image, or by varying the horizonal coordinates/locations on the retinae where the light pixels are received.

Figure 5:
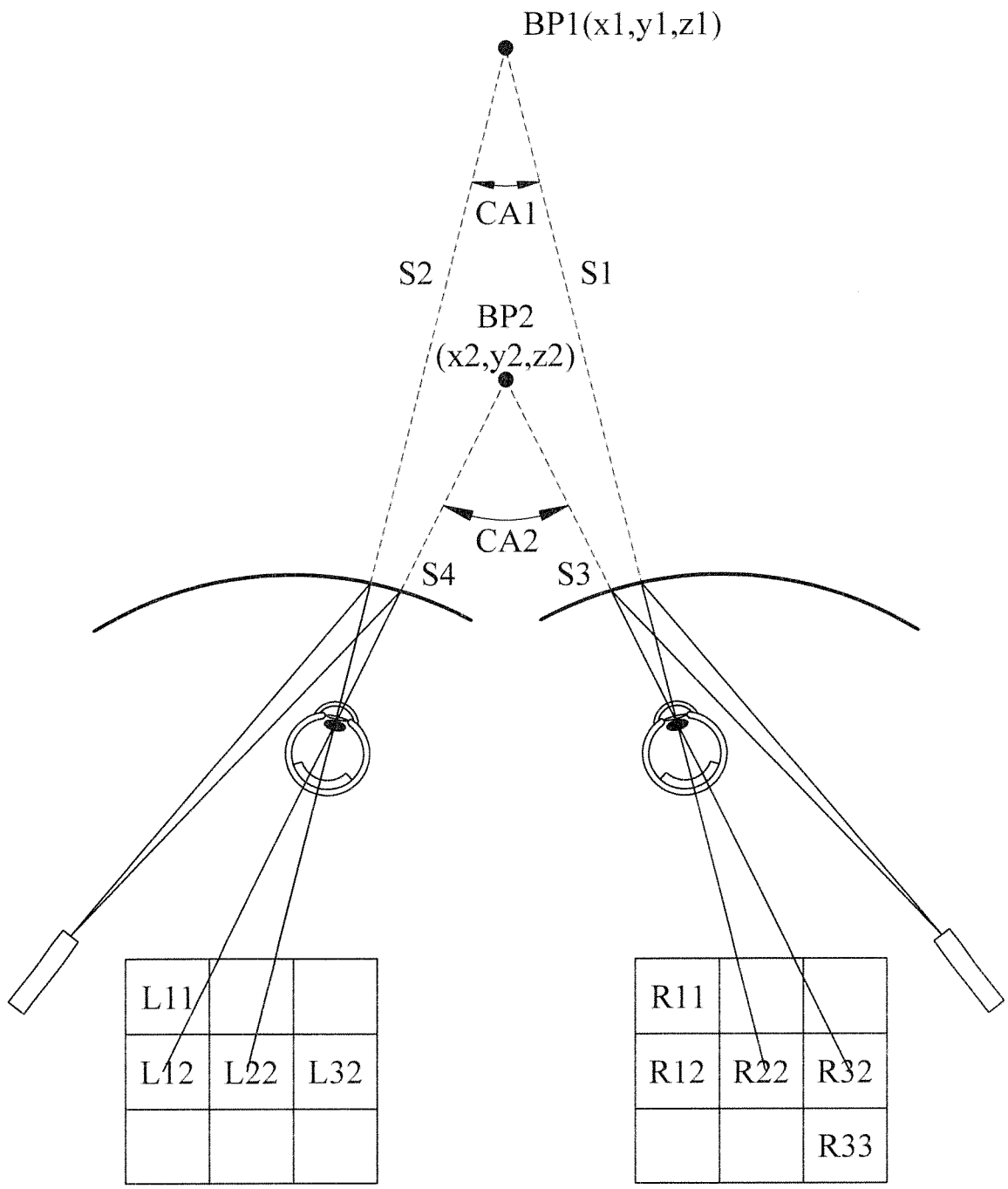
FIG. 5 illustrates the principle of rendering 3D perception of multiple binocular pixels simultaneously in accordance to the present invention.

With reference to FIG. 5, which illustrates the method for rendering depth perception based upon the principle mentioned above in accordance with the present invention. FIG. 5 shows a first binocular pixel BP1 formed by fusion of the right light signal S1 and the left light signal S2 having a first convergence angle CA1; and a second binocular pixel BP2 formed by fusion of the third light signal S3 and the fourth light signal S4 having a second convergence angle CA2. The first binocular pixel BP1 is rendered by projecting light signals to the pair of retina designated location pairs R22 (right retina designated location pair) and L22 (left retina designated location pair). The first binocular pixel BP1 is perceived by the user to have a larger depth (i.e., further away from the user) than the second binocular pixel BP2. The second binocular pixel BP2 is rendered by projecting light signals to the pair of retina designated location pairs R32 (right retina designated location pair) and L12 (left retina designated location pair). The horizontal distance between the third light signal S3 and the fourth light signal S4 on the retina (distance between R32 and L12) is larger than the horizontal distance between the right light signal S1 and the left light signal S2 on the retina (R22 and L22). As shown in FIG. 5, it can be understood that in order to render a binocular pixel having a depth coordinate of z1 at horizontal coordinate x1 and vertical coordinate of y1, light signals need to be projected to the retina designated location pair of R22 and L22. If a binocular pixel having a depth coordinate of z2 with the same horizontal coordinate x1 and vertical coordinate of y1 needs to be rendered, light signal needs to be projected to the retina designated location pair of R32 and L12. Evidently, variation in the depth coordinate of each of the at least one binocular pixel perceived by the user can be rendered by projecting light signals to different retina designated location pairs. In practice, each retina designated location pair can be given a address, x-y coordinate, or index to indicate the physical location on the left retina and right retina.

It is important to note that to have accurate depth perception, the orientation of the visual axes of the eyes needs to change (i.e., the eyes rotate toward the direction of the object) to allow the object's image to land on an area close to the center of the retinas (fovea). In the case where light from the object is received by an area outside the central region of the retinas (which means the visual axes of the eyes are not pointing at the object), depth perception is degraded. However, the viewer can still vaguely perceive the location and depth of the object. Therefore, when the viewer wants to view the object clearly, the eyes need to turn toward the object so that the light coming from the object lands close to the fovea, as shown in FIG. 5. Considered the case in which the viewer is originally fixating upon the first binocular pixel BP1, the right light signal S1 and the left light signal S2 land on the center portions of the retinae of the viewer. At this point the visual axes of the left eye and the right eye of the viewer is aligned with the optical path extension of the right light signal S1 and the left light signal S2. That is to say, in the present invention, the optical path of the light signals are configured such that when the viewer fixate on a binocular pixel, the visual axes of the two eyes are substantially align with the light path extensions of the light signals rendering the binocular pixel; furthermore, the optical convergent angle is the same as the convergent angle of the eyes of the viewer. This feature make sure that the convergent location of the visual axes of the eyes is substantially the same as the convergent point of the optical path extensions of the light signals, thereby, eliminating vergence accommodation conflict and focal rivalry. When the viewer wish to fixate on the second binocular pixel BP2, the eyes turn such that the center of the retinae can receive the third light signal S3 and the fourth light signal S4. As a result, the visual axes of the eyes are once again aligned with the light path extensions of the third light signal S3 and the fourth light signal S4. The convergent angle of the visual axes of the eyes become CA2.

Based upon the principle described above, in an embodiment which the origin of the three dimensional coordinate system is set at the center of the near-eye display, the depth coordinate perceived by the user in the real space of each of the binocular pixels having a specific horizontal coordinate and vertical coordinate is rendered by projecting the right light signal and the left light signal to a pair of retina designated location pairs (e.g., R22 and L22, or R32 and L12) respectively on surface of the right retina and the left retina. Each pair of retina designated location pairs renders a specific depth coordinate (and horizontal and vertical coordinates as well) perception for the user. Although in the description above, a matrix of 3×3 is used to illustrate this principle of human binocular vision, it is apparent that retina can be divided into more than a 3×3 matrix (e.g., 100×100 matrix or 1000×1000 matrix). Furthermore, the example is used to demonstrate the idea that for 3D coordinate, there exists a retina designated location pair on the right retina and another corresponding retina designated location pair on the left retina (pair of retina designated location pairs) on which the light signal can be projected so that the user can perceive a binocular pixel at that specific depth coordinate. In addition, the vertical coordinate or the horizontal coordinate perceived by the user in the real space of the at least one binocular pixel of the virtual image are also rendered by projecting the right light signal and the left light signal to a pair of retina designated location pairs on surface of the right retina and the left retina having vertical positions or horizontal position corresponding to the vertical coordinate or the horizontal coordinate.

Figure 6A:
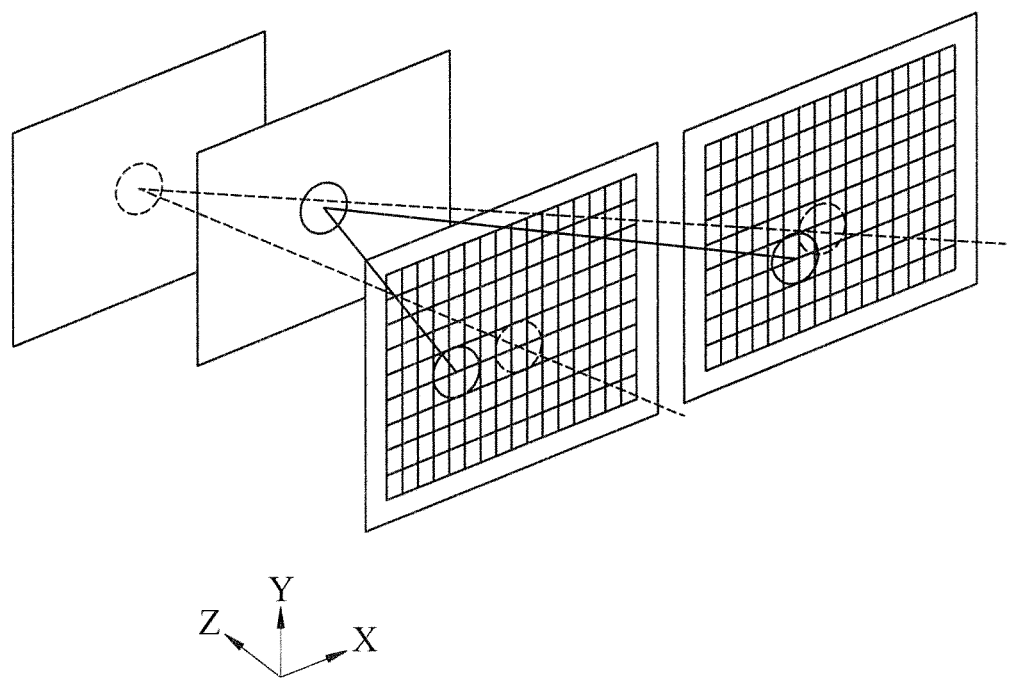
FIG. 6A illustrates the method for displaying a virtual object moving only along Z axis direction.
Figure 6B:
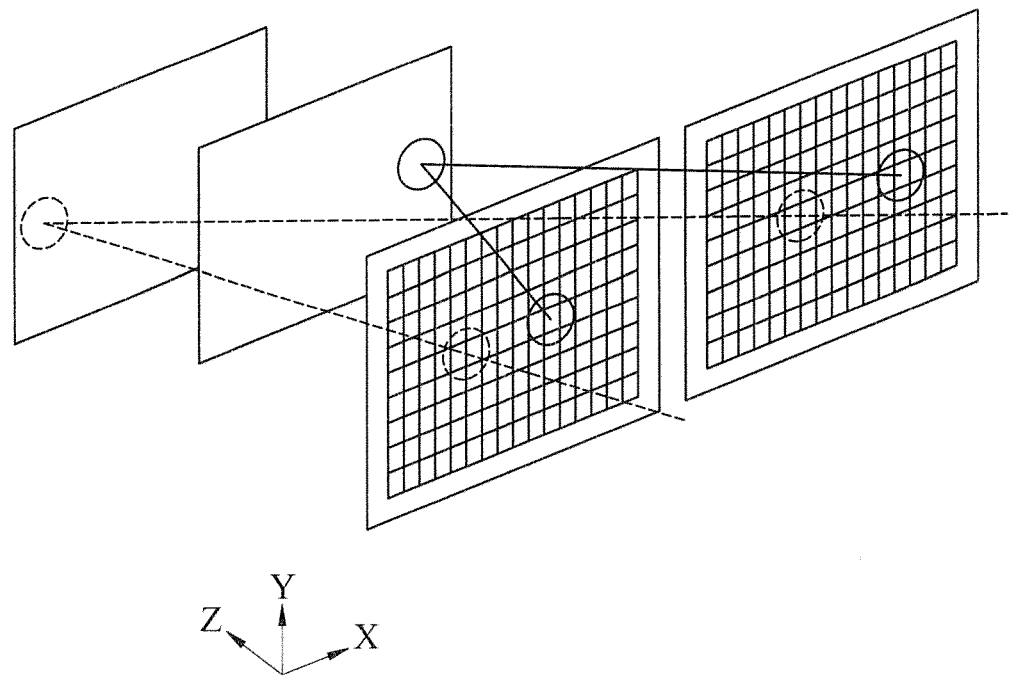
FIG. 6B illustrates the method for displaying a virtual object moving in X axis direction and Z axis direction.

FIG. 6A illustrates a virtual object moving only along Z axis direction (closer to the user) and thus from an original depth plane to a new depth plane. To do so, the locations of right light signals and the corresponding left light signals respectively on the right retina and the left retina forming the virtual object need to move far away from each other in X axis (horizontal) direction. In other words, when the virtual object moves closer to the user, the relative distance between locations of right light signals and corresponding left light signals on the retina images increases. Since the Y-coordinate of the virtual object remains the same, the right light signals and corresponding left light signals are projected on the same Y-coordinate location of the combiner images. FIG. 6B illustrates a virtual object moving in X axis direction (to the right) and Z axis direction (closer to user) and thus from an original depth plane to a new depth plane. To do so, the locations of right light signals and the corresponding left light signals respectively on the right retina and the left retina need to move to the right in X axis direction and farther away from each other in X axis direction. In other words, the right light signal and corresponding left light signal need to be projected to the right and farther away to each other in the same time in X axis direction. Since the Y-coordinate of the virtual object remains the same, the right light signals and corresponding left light signals are projected on the same Y-coordinate location of the combiner images.

Figures 7A, 7B:
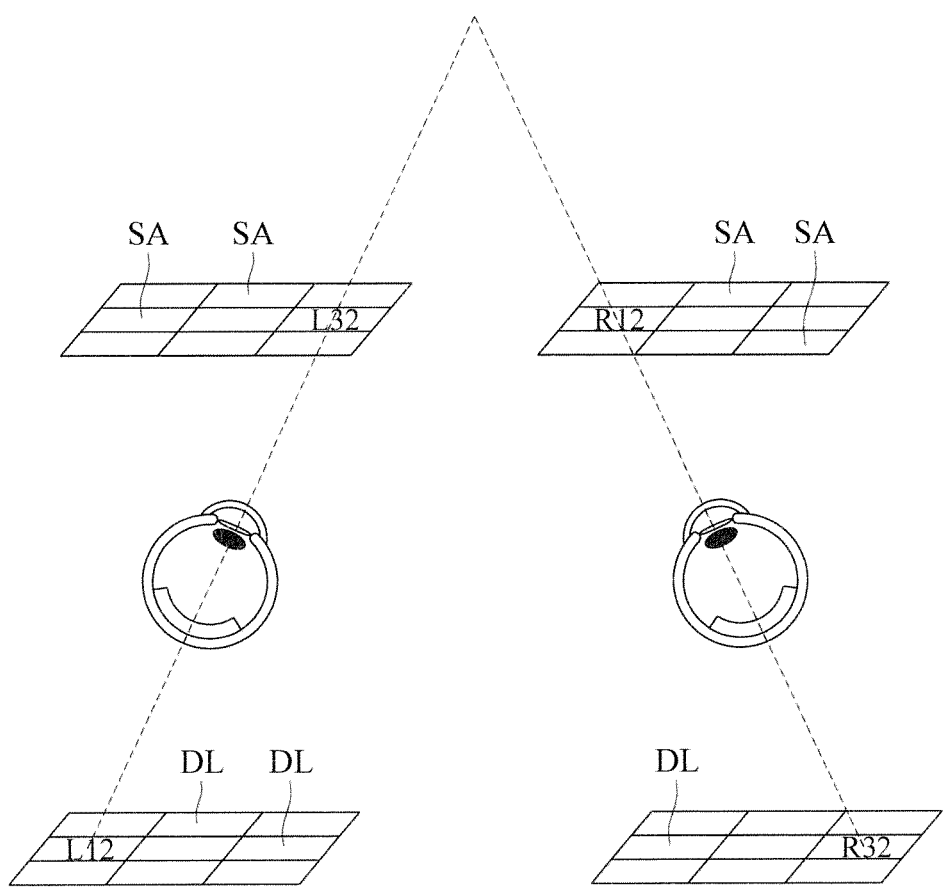
FIG. 7A is a look-up for identifying the correct designated location pair for rendering a depth coordinate at specific vertical and horizontal coordinate for a binocular pixel.
FIG. 7B illustrates the relationship between the subunit areas and the corresponding designated area of the retina.

With reference to FIG. 7A, a look-up table (e.g., viewer space mapping table) may be constructed to quickly identify the correct designated location pair for rendering a depth coordinate at specific vertical and horizontal coordinate for a binocular pixel. For example, 216 virtual binocular pixels, numbering from 1 to 216, are formed by projecting light signals to 36 (6×6) designated location on the right retina and 36 (6×6) designated location on the left retina. The first (1st) binocular pixel BP(1) having horizontal coordinate x1, vertical coordinate y1, and depth coordinate z1 is rendered by the pair of designated locations R(11) and L(11); the second (2nd) binocular pixel BP(2) having horizontal coordinate x2, vertical coordinate y2, and depth coordinate 22 is rendered by the pair of designated locations R(12) and left pixel L(11). Thus, in order to display a binocular pixel at a specific 3-dimensional coordinate in real space, the light signals projected into the left eye and the right eye of the user need to be received at the corresponding designated locations on the surface of the retinae of the user based on the information of the look up table.

In practice, in order to accurately project light signal to the desired designated locations on the retinae of the user, the locations where the projected light signal entering the pupils is a key factor to be considered. In other words, the location where the first and second light signal entering the pupils can be controlled such that the light signals can reach the correct location on the retinae so as to render a binocular pixel at a specific spatial location. The area right before the pupil receives the incoming light signal can also be viewed as a matrix and can be divided into several subunit areas, similar to that of the designated locations on the retina aforementioned (with reference to 7B). Each of the subunit areas SA correlate to a designated location DL on the retain. Therefore, when a light signal enters the pupil via specific subunit areas with specific angles, the corresponding designated locations on the retain which receive the light signal can be anticipated. In an embodiment, a lookup table may also be constructed to determine the location of entering the pupil for the light signal to ensure the light signal can be received by the desired designated location pairs on the retinae. In one embodiment, the relationship between the subunit areas and the corresponding designated area of the retina is shown in FIG. 7B. In this example, for the light signals to be received by the pair of designated locations R32 and L12 on the retinae, the light signals need to go through subunit R12 and L32 in front of the area before entering the pupil. Therefore, in order to change the depth of a binocular pixel perceived by the user from one position to another, the light signals can be projected via different pair of subunit areas SA that correlate to the target designated locations on the retinae, thereby, allowing the target designated location pair to receive the light signals.

Figure 8:
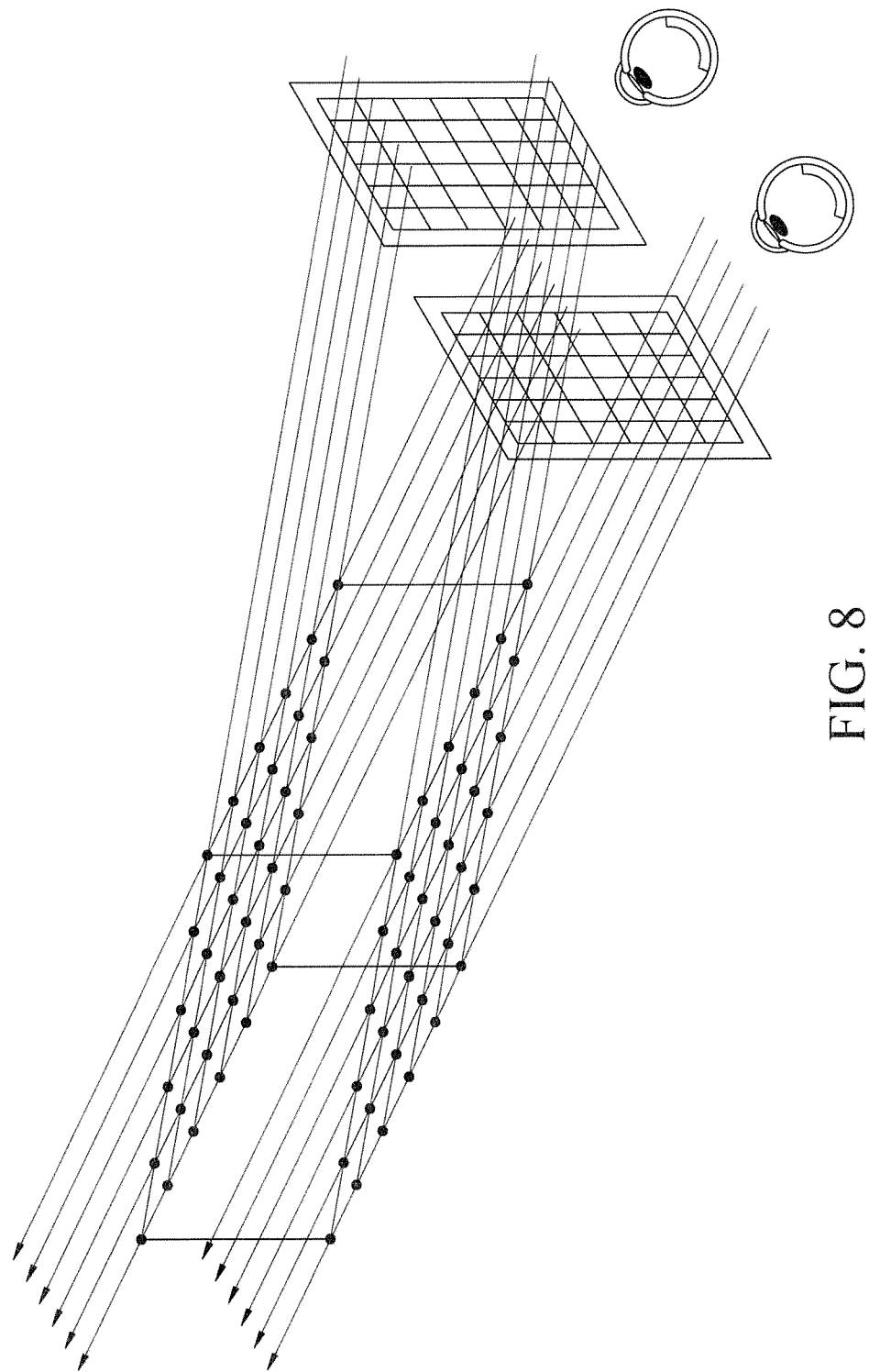
FIG. 8 illustrates the relationship between the binocular pixels and the subunit areas pairs which forms the binocular pixels.

FIG. 8 further illustrates the relationship between the binocular pixels and the subunit areas pairs which forms the binocular pixels. In this example, there are 36 (6×6) subunit area pairs for each eye. It is known that in order for fusion of vision to happen, the image projected to the right eye and the corresponding image projected to the left eye need to have similar vertical position (relative to the eyes of the human). Therefore, the retina designated location pairs and the subunit area pairs need to have substantially the same vertical position (relative to the eyes of the human). In FIG. 8, the light path extension of one light signal intersects the light path extension of the corresponding light signal on the same row (i.e., same vertical position). Based on this prerequisite, and after taking the vertical coordinate and horizontal coordinate into consideration, a total of 216 (6×6×6) virtual binocular pixels with different 3-dimensional coordinates (shown as a dot) can be created. Assume that each retina, both left and right, is projected with a 6×6 grid of 64 image pixels. The pixels perceived by the left eye are represented in a matrix format as L11, L12, . . . , L16, L21 . . . L26, . . . , L61 . . . L66, where the number on the left indicates the row, and the number on the right indicates the column. Similarly, the matrix R11, R12, . . . , R16, R21 . . . R26, . . . , R61 . . . R66 represents the 64 image pixels perceived by the right eye. Now, let's assume that only pixels having the same vertical height (in the same row from the left and right matrix) on both retinas can be fixated upon and fused. Thus, any rendered binocular pixels being fixated on by the user (i.e., where the lines of sight from both eyes converge) at the height of the first row could be composed of the combination of R11, R12, . . . , R16 and L11, L11, . . . L16. Similarly, any rendered binocular pixels being fixated on by the user at the height of the second row could be composed of the combination of R21, R22, . . . , R26 and L21, L21, . . . L26. In this invention, any pixel in one eye's image, when paired with a pixel at the same height (i.e., the same row in the matrix) in the other eye's image, corresponds to a unique intersection point in real space. Therefore, we can create a mapping table that maps the spatial coordinates within both field of view for the projector of a binocular pixel to the retina designated location pair. In this way, once the spatial coordinates of a binocular pixel is determined, the table can be used to pinpoint the corresponding matrix positions on the left and right retinas that the monocular pixels should be projected onto. As shown from above, it can be understood that the retina is equivalent to image sensors in imaging device (such as cameras).

Figure 9:
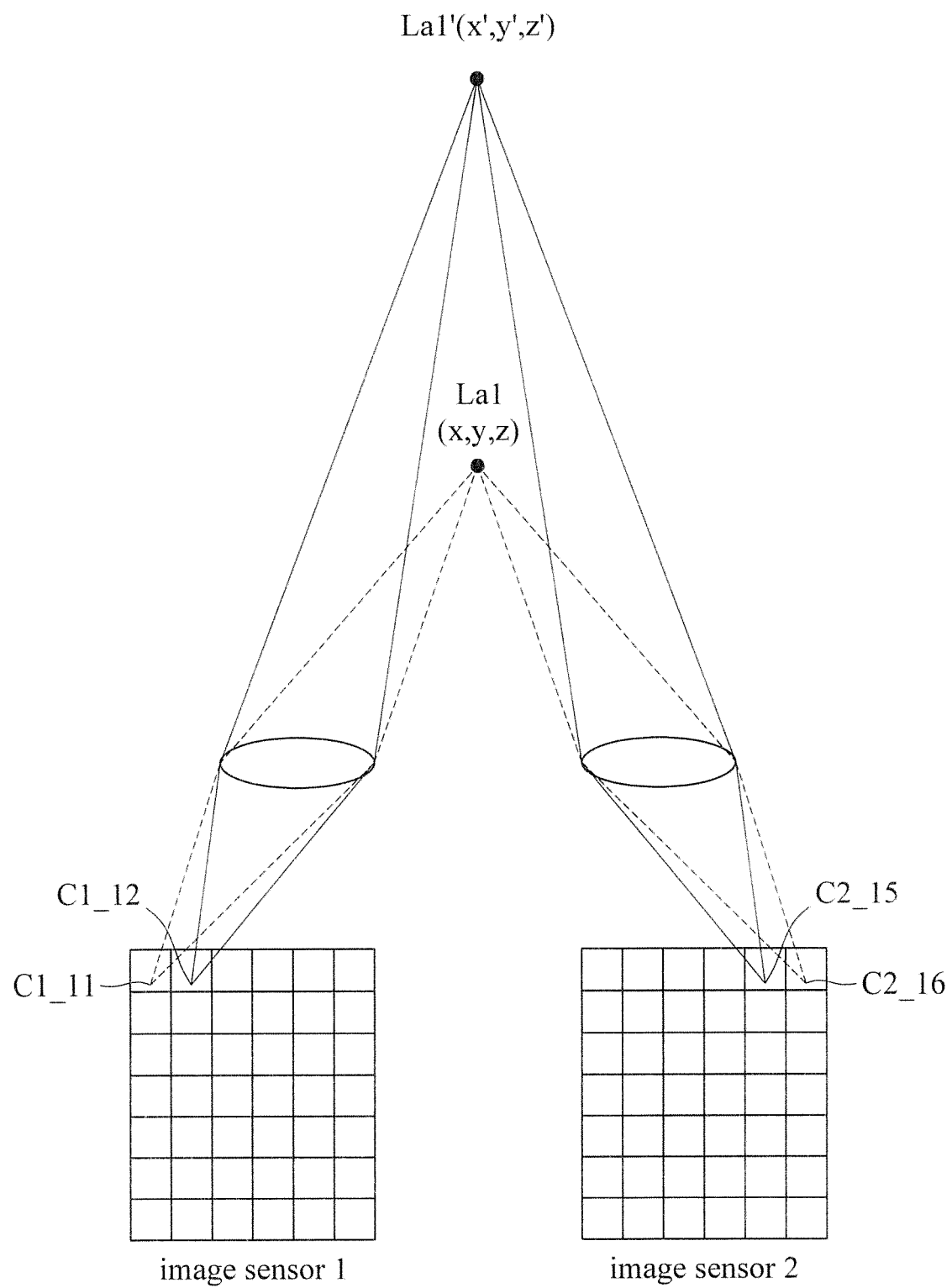
FIG. 9 shows that when the depth coordinate of a point-like object changes, the locations where the images are received changes.

The following illustrate the method for detecting a 3D coordinate of an real object using multiple imaging devices. With reference to FIG. 9, it is shown that when the depth coordinate of a point-like object changes, the locations (on the image sensors of a plurality of imaging devices) where the images are received changes. Particularly, it is shown that the horizontal location on the image sensor where the images are received changes according to the change in the depth coordinate of the object. For simplicity, the lens system in the camera is simplified and illustrated as a simple concave lens, although in reality, the lens system may be much more complex. The image sensor of the camera comprise a plurality of sensing cells, each of which is given a coordinate (or address). In FIG. 9 only 36 cells are shown for simplicity. As an example, the object is initially at a location La1, the image of the object is received by image sensor 1 of a first camera, and image sensor 2 of a second camera. The first camera and the second camera are provided at different spatial locations. The image is respectively received by sensing cell C1_11 on the image sensor 1 and sensing cel C2_16 on the image sensor 2. When the object moves further away from the cameras in the depth direction to location La1', the image is respectively received by sensing cell C1_12 on the image sensor 1 and sensing cel C2_15 on the image sensor 2. In other words, the location pair for receiving the image changes from (C1_11, C2_16) to (C1_12, C2_15) when the object moves from La1 to La1'. Notice that La1 has a spatial coordinate of (x,y,z) in real space, and La1' has a spatial coordinate of (x',y',z') in real space. It is apparent that for every spatial coordinate in real space, there is a corresponding bitmap unit pair (formed by the coordinate or address of the location where the image is received by the image sensor 1 and the image sensor 2) that correspond to the spatial coordinate. For example the bitmap unit pair (C1_11, C2_16) correspond to spatial coordinate of (x,y,z); and bitmap unit pair (C1_12, C2_15) correspond to spatial coordinate of (x',y',z'). That means, for example, when the bitmap unit pair (C1_11, C2_16) receives image from a small portion of an object, that portion of the object is located at (x,y,z) in the physical space; when the bitmap unit pair (C1_12, C2_15) receives image from a small portion of an object, that portion of the object is located at (x',y',z') in the physical space. Therefore, in theory, it is possible to determine the spatial location of an object or a portion of an object from the addresses or coordinates of the pixels in the first and second image and sensor which receives the image of the object. In some instances, each portion of the real object may have different spatial coordinates; therefore, the image of the real object may be received by a plurality of bitmap unit pairs, each bitmap unit pair from the plurality of bitmap unit pairs corresponds to different portion of the real object and represents different spatial coordinates. Based on this fact, a mapping table (e.g., imaging device space mapping table) which map each possible bitmap unit pair to a corresponding 3D spatial coordinate in real space can be constructed.

In some embodiments, the present invention may further comprise a object identification module for identifying an specific object from the images captured by a plurality of cameras. The object identification module is able to identify the pixel value changes in the image sensors so as to track the shift in pixel coordinates of the image of the target object, thereby, identify the change in coordinates of the image cells (or pixels) which are receiving the image of the target object at a given moment. Once the coordinates of the image cells (or pixels) receiving the image of the target object are known, the bitmap unit pairs receiving the image are also known; in turn, the spatial location of the object can be determined.

Based upon the above principles, it is also possible to convert bitmap unit pairs in the images captured by multiple cameras to retina designated location pairs in the retina (by first construct a pixel mapping table which address the conversion between bitmap unit pairs and retina designated location pairs), taking the user's interpupillary distance into account. As mentioned, a table comprising the information of each bitmap unit pair and the corresponding spatial coordinate (x,y,z) cab be constructed. Meanwhile, another table comprising the information of the each retina designated location pair and the corresponding spatial coordinate (x,y,z) can also be constructed. Thereby, the mapping/conversion between bitmap unit pair and retina designated location pair can be performed. However, before the mapping/conversion, there are several factors needed to be considered for successful conversion or mapping the bitmap unit pair to the retina designated location pairs. Since the cameras are positioned differently with respect to the user's eyes, the view angles and the coordinate of the captured images is not the same as the view angles of the eyes of the user; as a result, a coordinate transformation and pixel interpolation is needed to fit the view angles of the cameras images into the view angles of the left eye and right eye of the user.

For the initiation of the mapping/conversion between bitmap unit pair and retina designated location pair, a positioning procedure between the cameras and the near-eye display needs to be performed. Notice that the near-eye display is worn by the user and positioned closed to the eyes of the user. After the positioning of the cameras and the near-eye display are completed, a "point-to-point" coordinate transformation table (pixel mapping table) is ready to be established. In this table, each pixel in the image (2 dimensional image) captured by one of the cameras is associated to a corresponding pixel in an image frame (projected to the retina of the user) which would be rendered by the near-eye display. Since the number or density of pixels in the image captured by a camera may be different from the number or density of pixels which the near-eye display can render, an image processing procedure need to be carried out first to deal with the pixel numbers mismatch. The number or density of pixel in can be measured based on the number or density of pixel within the field of view of the camera or the field of view which the light emitter can produce. Suppose the number or density of pixel of an image frame produced by the near-eye display is less than the image captured by the camera; the coordinate of a pixel produced by the near-eye display may be set as the mid-point of the coordinates of the corresponding two pixels in the image captured by the camera (pixel interpolation). On the other hand, suppose the number of pixel produced by the near-eye display is more than the image captured by the camera; the coordinate of a pixel captured by the camera may be compared to the coordinate of its neighboring pixel for determining an mid-point coordinate needed to fill in for the pixels produced by the near-eye display (pixel extrapolation).

Coordinate transformation allows us to locate coordinates of regions in the original camera images and map their pixel values (RGB values) to fit the user's 2D perspective. As previously noted, any missing pixels due to differences in viewing angles or pixel resolutions between the cameras and the near-eye display can be filled by using interpolation or extrapolation. When carrying out coordinate transformations, calculations can initially focus on a single eye. In some embodiments, the camera's position is treated as the origin of the 2D coordinate system (e.g., XY plane) for its captured image, while the pupil position of the left or right eye serves as the origins of the 2D coordinate system for the user's perspective. The orientation differences between these two-coordinate system, primarily in the horizontal and vertical orientation, must be taken into account. The camera's centerline of view (i.e., the line connecting the camera lens to the center of field of view of the camera) and the user's line of sight (i.e., the line from the pupil to the near-eye display's field center) should ideally lie on parallel planes, though they may vary in height. In other words, the viewing angle of the camera should match the elevation angle of the user's line of sight through the near-eye display. If these lines do not lie on parallel planes, the complexity of coordinate transformations will increase. For example, if an orientation difference on the XZ plane exists between the camera's field of view and the user's field of view (meaning there is a rotation angle between the two 2D XY planes in the XZ plane direction), this implies that these two XY planes are not on the same plane. Thus, any missing pixels must be filled in using interpolation or extrapolation methods.

The following summarizes the method for coordinate transformation from the image captured by the cameras to image rendered by the near-eye display for providing to the user. First, calculate the horizontal and vertical distance differences between the camera's position and the positions of the user's left and right eye. Based on these distance differences, along with the information regarding the field of view (FOV) and center point of the camera and near-eye display, we can compute the translation and rotation angles of the camera on the horizontal and vertical planes relative to the user's eyes. Next, using coordinate transformation, the center point of the field of view of one of the user's eyes, for instance, the left eye, is mapped to the corresponding coordinate in the image captured by the left-side camera. Notice that the field of view of one of the user's eyes refers to the field of view which the near-eye display can display or project to said eye of the user; or in other words, it is the field of view which the eye can see virtual image provided by the near-eye display. If there are other cameras, the corresponding coordinate in other cameras' fields of view may also be calculated. The pixel coordinate of the center point is map to the corresponding pixel and its coordinate in the 2D image captured by the camera. Next, for each horizontal row of pixels within the user's left-eye field of view, find the center point for each pixel row and determine the corresponding pixel and its coordinate in the 2D image of the camera from top to bottom. In the following, the corresponding coordinates of pixels in the camera image that is equivalent to the left and right boundary lines of the user's field of view are identified; then, the pixel coordinate from the camera image equivalent to the left and right boundary in the user's field of view are sequentially mapped to the pixels in left and right boundary lines of the user's field of view. If an exact boundary point cannot be found, interpolation can be used to obtain the pixel coordinate. At this stage, the pixel coordinate for the center points of each row and the boundary points in the user's field of view are fully generated. As an example, suppose the near-eye display has a resolution of 1280×720 pixels, with a field of view (FOV) of 40 degrees (horizontal) and 22.5 degrees (vertical), and assuming that each degree within the FOV corresponds to the same number of pixels. Assuming the center of the image rendered by the near-eye display is at coordinates (0, 0), then:

The left boundary is defined by (−640, y), where −360<y≤360.
The right boundary is defined by (640, y).
The upper boundary is defined by (x, 360), where −640<x≤640.
The lower boundary is defined by (x, −360).

So far, the central points and the left and right boundary pixels for each row in the user's perspective image have already been mapped. Next, we map the pixel extending from the center axis of the view (i.e., the line connecting the center points of each row) towards the boundaries on both sides (e.g., ±1 degree of the field of view). Given that the near-eye display has a horizontal resolution of 1280 pixels, each degree of the field of view corresponds to approximately 32 pixels. Following this, the central 64 pixels are from the original camera image. If there is no direct match, interpolation is used to fill in the gaps. This process is then repeated outward from the center, gradually going through the field of view of the user until a full 1280×720 pixel image is reconstructed, completing the 2D reconstruction of the user's perspective. A pixel mapping table then can be created for all pixel within the fields of view of both the left and right eyes. All subsequent images captured by the camera can be instantly converted into the user's perspective on the near-eye display using this mapping table.

When creating this mapping table, it is essential to take into account the range of head rotation angles covered by both the near-eye display and the in-vehicle camera. This involves pre-calculating all possible coordinates that might be included in the range of head rotation. By doing so, when the user is moving, no matter how the user turns the head, the correct field of view can be quickly retrieved from the mapping table to display the appropriate image.

In some embodiments of the present invention, when an object appears near the centerline of the field of view of the user, the image of the object, which the near-eye display generates, should have greater pixel density than objects that are farther from the centerline. Generally speaking, when more than two cameras are implemented, different cameras positioned in different location can be chosen for interpolation or extrapolation. For example, cameras placed away from the users are better suited for filling in details on the outer edges of the field of view, while cameras located at the center of the field of view are more effective for enhancing the image closer to the center of the field of view. Generally, the resolution and field of view (FOV) of the cameras are much higher than those of near-eye display, allowing for a more refined and effective interpolation or extrapolation result.

As mentioned earlier, the phrase field of view of the user implies the field of view in which the user is able to see the virtual image produced by the near-eye display; therefore, it is equivalent to the field of view which the near-eye display can produce for the user. According to the method above, the field of view of the camera and the image captured by the camera from its point of view can be converted or mapped (pixel mapping table) so as to create an image viewed from the orientation of the user. Once this is completed, the mapping/conversion between bitmap unit pair and retina designated location pair can be performed directly. The field of view of the user is defined by what appears directly in front of the user while wearing the near-eye display. When the user turns the head, a inertial measurement unit (IMU) in the near-eye display informs the system a change in orientation of the user so as to display scene to match the new direction, maintaining consistency with the user's perspective.

We can combine the aforementioned method for determining a spatial location (including depth) of an object and the method for rendering a pixelized image with depth together, to facilitate superimposition of a virtual image onto a real object. Notice that when the camera captures an image, each image pixel can be treated as an image of a point-like object; therefore, for example, if a full image is composed of 1920×1080 pixels, it is considered that the image is the collective of 1920×1080 point like objects. Each pixel (or each point-like object) represents the image of a small portion of the real object, and each small portion of the real object has a unique spatial coordinate. Now it can be understood that an image of each point-like object (which has a unique spatial coordinate) may be captured by a unique bitmap unit pair of the image sensor. Furthermore, the bitmap unit pair of the sensing cell can be mapped to a specific spatial coordinate in 3D real space. As a result, for rendering a virtual object superimposed onto a portion of a real object, the near-eye display system projects the light signal of each of the pixels of a virtual image onto the selected desired retina designated location pairs on the retinae which can render the binocular pixels having the same spatial coordinates in 3D real space as the corresponding bitmap unit pairs, thereby, creating an accurate superposition of the virtual image onto the real object relative to the conventional method. In the present invention, when the binocular virtual image is projected onto a real object in the physical space, since the 3D coordinates (including the depth) of the real object can be set to be consistent with the 3D coordinates (including the depth) of the intersection of the optical paths extension of the first collimated light signal and the second collimated light signal; in another words, the 3D coordinates (including the depth) of the real object (or a portion of the real object) is in proximity substantially to the 3D coordinates (including the depth) of the intersection of the optical paths extension of the first collimated light signal and the second collimated light signal, so that the user can clearly see the physical object and the binocular virtual image simultaneously without focal rivalry. Since the location and the depth of the binocular virtual image in real space can be determined from the intersection of the optical paths extension of the first collimated light signal and the second collimated light signal in the physical space, therefore the binocular virtual image can be directly converted to the coordinates in the physical space, and the binocular virtual image in the physical space can be easily compared with the coordinates of the real object, and the interaction between the virtual object and the real object can be more accurate. The present invention offers a more accurate alternative to current SLAM technology, which uses distance sensors and "point cloud" data for positioning but often lacks precision.

Figure 10:
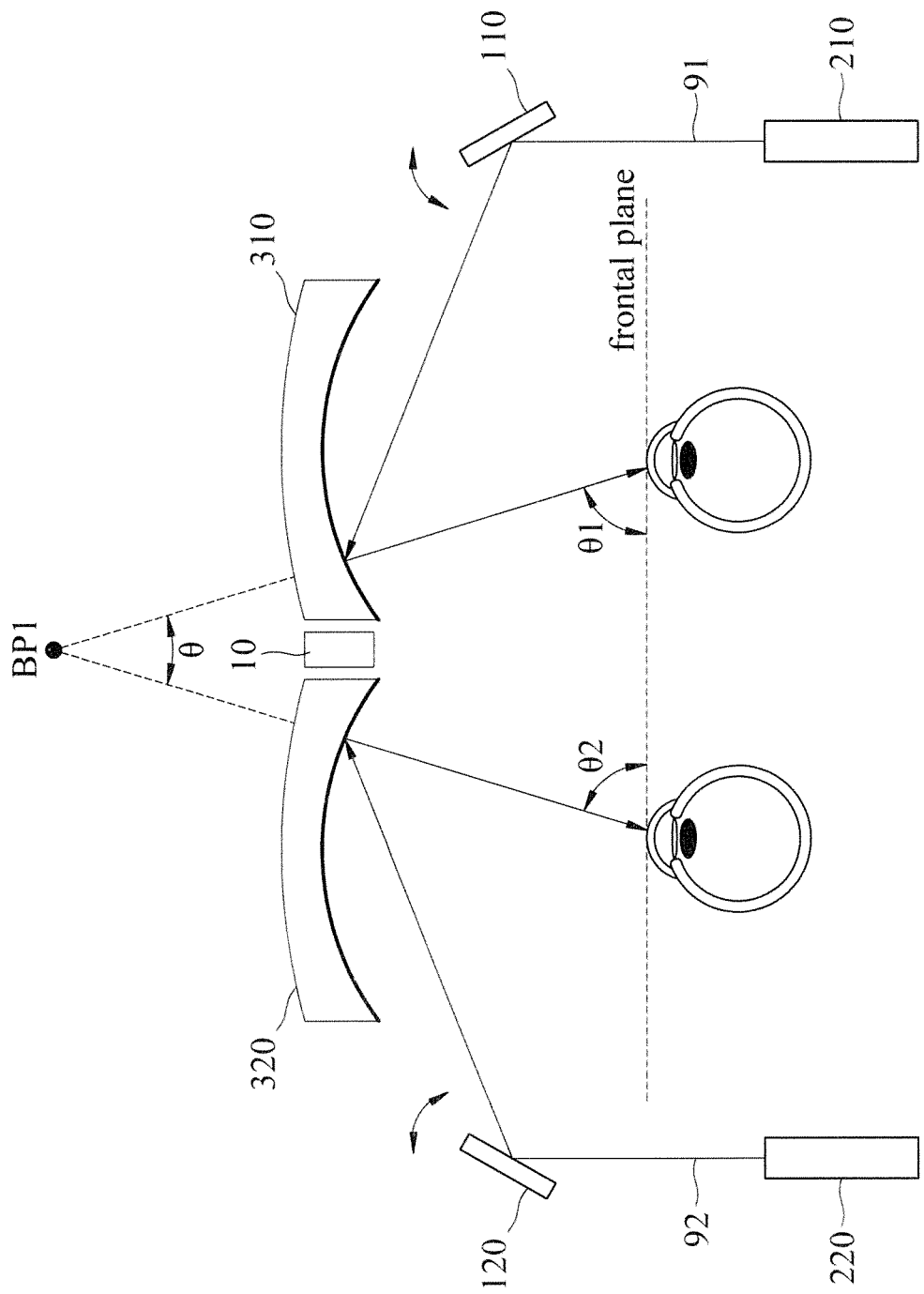
FIG. 10 illustrates and exemplary embodiment of the near-eye display.

The near-eye display system in the present invention is not restricted to a specific type of display system. However, the following uses retina scanning based near-eye display system as an example for demonstrating the principle of the present invention. With reference to FIG. 10, the near-eye display system may comprise a first light direction modifier 110, a second light direction modifier 120, a first emitter 210 and a second emitter 220. The emitters may use laser as light source. In some embodiments, the emitted light signals emitted by the first emitter 210 and the second emitter 220 are collimated. Each light signal may render a pixel from an image frame containing a plurality of pixels (e.g., 1280×720 pixels). Each light signal is collimated in the present embodiment. In one embodiment, the first and second emitters 210, 220 are laser beam scanning emitters (LBS projector, or micro LED . . . etc.) which may comprise a red color light laser, a green color light laser, and a blue color light laser. As an example, the LBS projector sequentially generates and scans light signals one by one to form a 2D image at a predetermined resolution, for example 1280×720 pixels per frame. In some other embodiments, the near-eye display system may further comprise a first combiner 310 and a second combiner 320 for reflecting the light from the first light direction modifier 110 and second light direction modifier 120 to the first and left eye of the user.

The direction of a first collimated light signal 91 and a second collimated light signal 92 respectively emitted by the first emitter 210 and the second emitter 220 are controlled such that the first collimated light signal 91 and the second collimated light signal 92 are respectively emitted toward the right eye and the left eye with a first angle θ1 and a second angle θ2 respectively that are altering relative a frontal plane of a user to render a binocular virtual image having variable depth perception for the user. The first angle θ1 and a second angle θ2 are controlled such that the first light signal 91 and the second light signal 92 are projected to the desired retina designated location pair for rendering a binocular pixel BP1 existing at a specific 3D coordinate. When the user fixating on the binocular pixel BP1, the line from the image of the binocular pixel BP1 on the left retina to the left pupil (left visual axis) and the corresponding line from the image of the binocular pixel BP1 on the right retina to the right pupil (right visual axis) converge at the 3D coordinate of the binocular pixel BP1 in space.

Figure 11A:
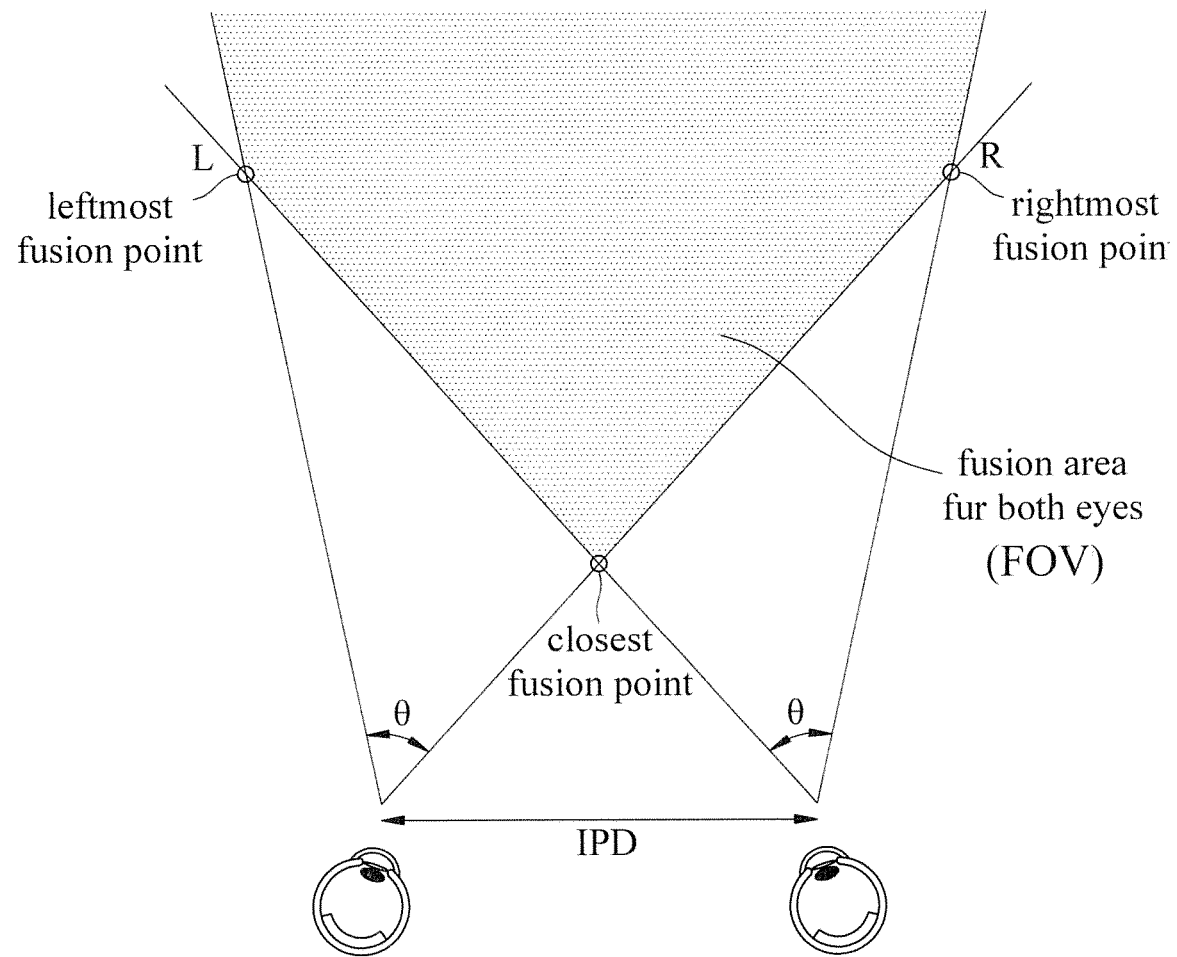
FIG. 11A illustrates the fusion area for both eyes of the user.
Figure 11B:
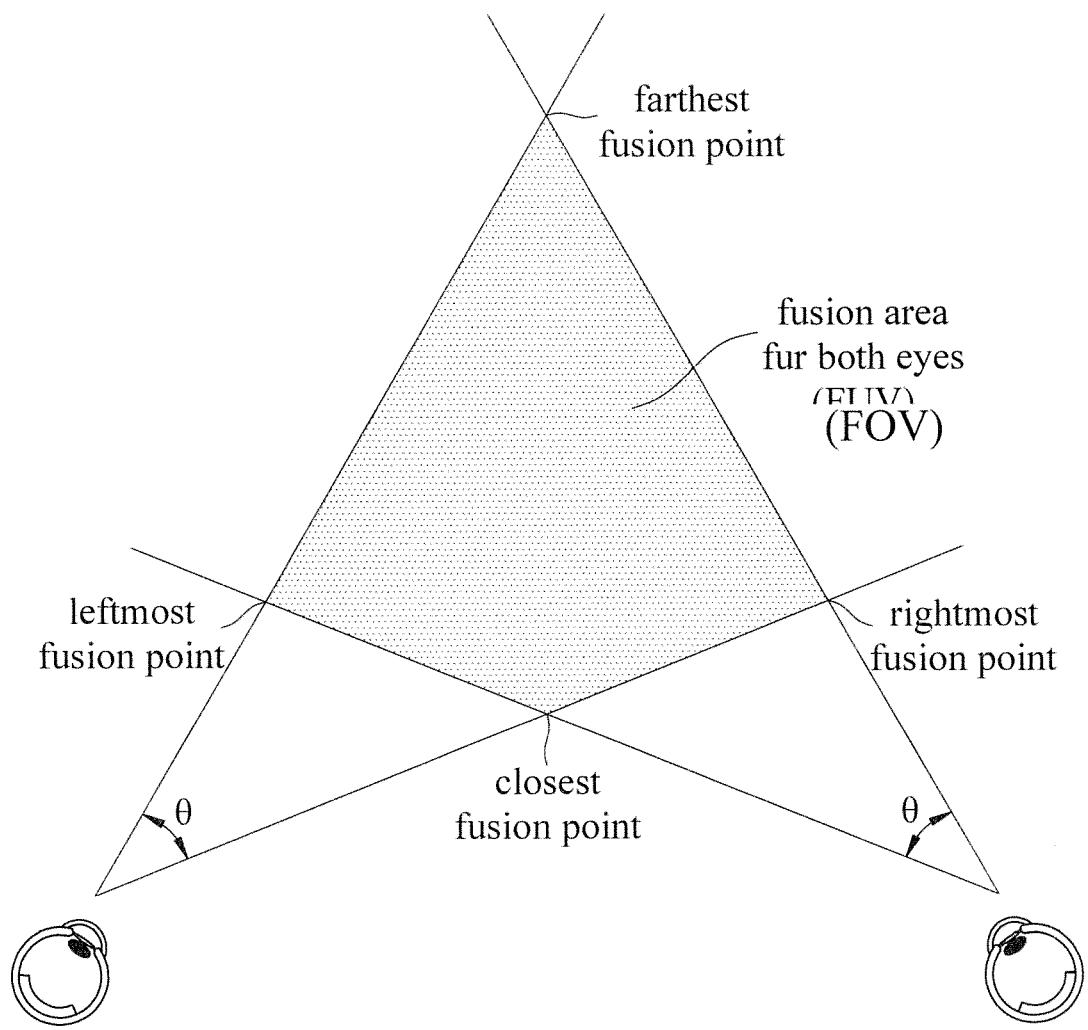
FIG. 11B illustrates the fusion area for both eyes of the user.

In the present invention, regardless of the type of light emitter used, the light emitter usually has a limited projection angle, which restricts the field of view within which the user can perceive virtual images. For examples, the projection angle (after light redirected by the combiners)/the field of view for the user provided by the light emitters are illustrated in FIGS. 11A and 11B. The shaded area is covered by projection angle of both first and second light emitters; the user is able to perceive 3D binocular pixels within this area, therefore it is considered as the field of view of the user. Once the minimum visible distance (closest vision fusion point) for both eyes is determined in advance, the entire binocular field of view (represented by the shaded area in the figure) can be calculated based on the user's interpupillary distance (IPD). The shape of fusion area (the area in which the fusion of the left monocular image/pixel and right monocular image/pixel can occur to create a binocular pixel) for both eyes is dependent upon the orientation of the light emitter and the combiner.

Figure 11C:
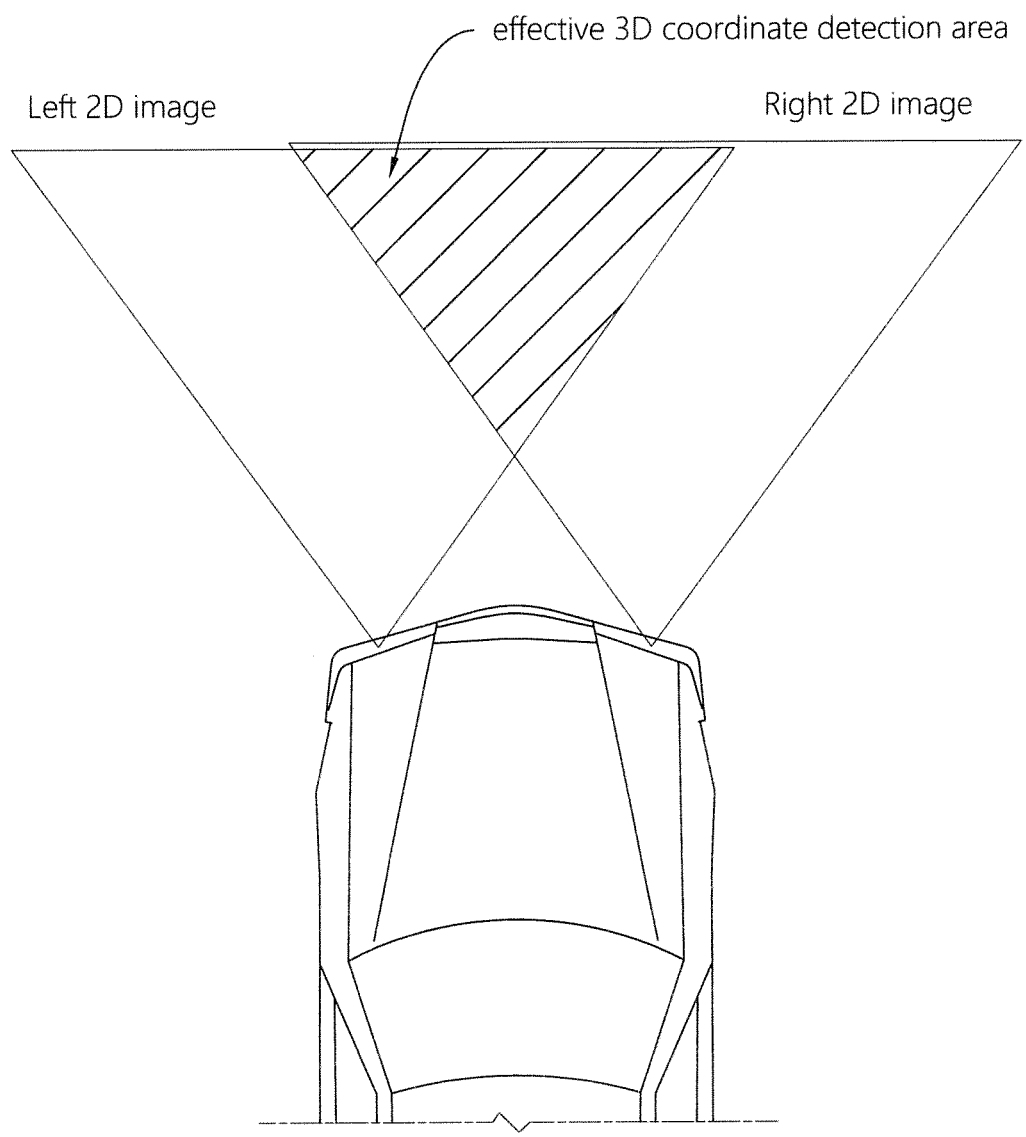
FIG. 11C illustrates the effective 3D coordinate detection area according to one embodiment of the invention.

With reference to FIG. 11C, it illustrates the effective 3D coordinate detection area according to one embodiment of the invention. The two cameras may be provided on a car for detecting 3D coordinates of the object ahead. The shaded area is covered by of both first and second cameras; in this area, it is possible to 3D position of any object. Once the minimum overlapping point (closest to the user) for both cameras is determined in advance, the entire detectable field (represented by the shaded area in the figure) can be calculated based on the relative distance between the cameras.

In one embodiment of the present invention, the near-eye display system of the present invention may further comprise an eye-tracking device for determining the orientation of the eyes of the user. The eye-tracking device can determine the visual axes of the eyes' of the user, thereby accurately determine the physical location where the visual axes of the two eyes converge. This information can also be used in part to determine which retina designated location pairs of the user are receiving the image; thereby, to determine the space coordinate of the object which the user is fixating upon.

Figure 12:
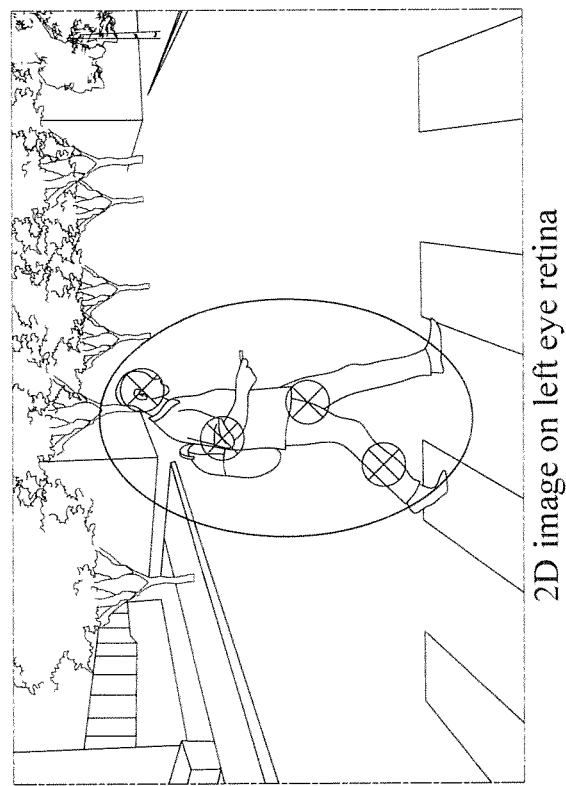
FIG. 12 illustrates one possible application of the present invention.
Figure 12:
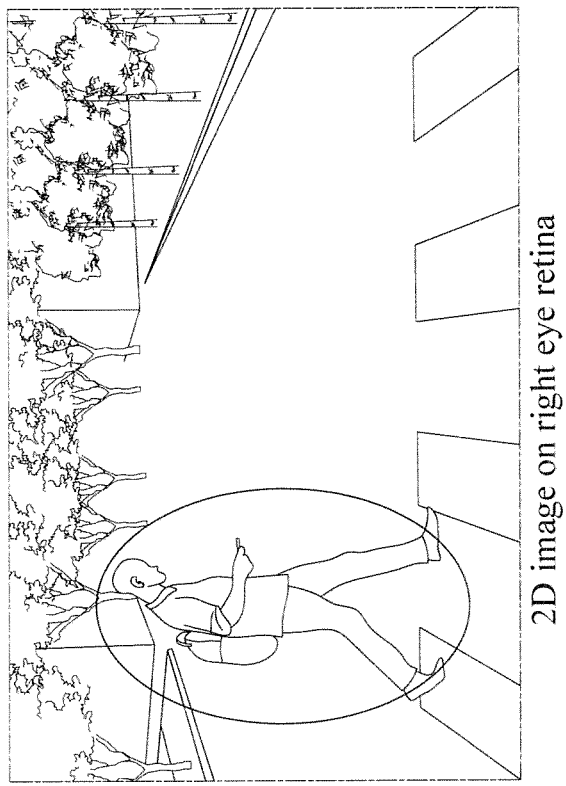
Figure 12:
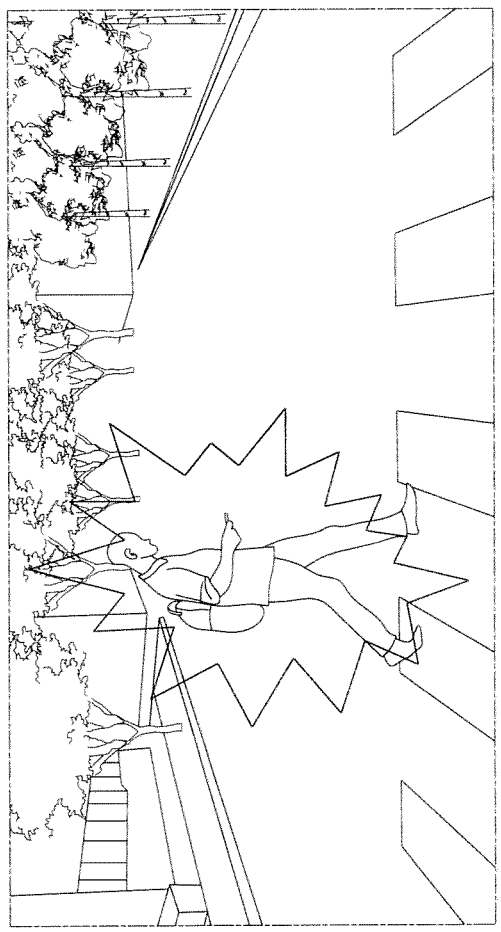

FIG. 12 illustrates one possible application of the present invention. In one embodiment, the invention may further include an object recognition module to identify objects in images captured by first and second imaging devices, such as cameras. When a user wears the near-eye display system while driving, the object recognition module can help identify potential hazards to prevent accidents. For example, the first and second cameras continuously capture real-time images of the surroundings. The object recognition module processes these images to identify potential hazards, such as pedestrians. The coordinates of the pedestrian in real space can be determined using the aforementioned method. If the hazardous object is determined to be within a certain distance, the near-eye display system can superimpose a warning image, such as a highlighted image of the hazardous object. The superimposed image will be at the same depth as the actual object, allowing the user to accurately perceive the hazard and avoid accidents.

Figure 13:
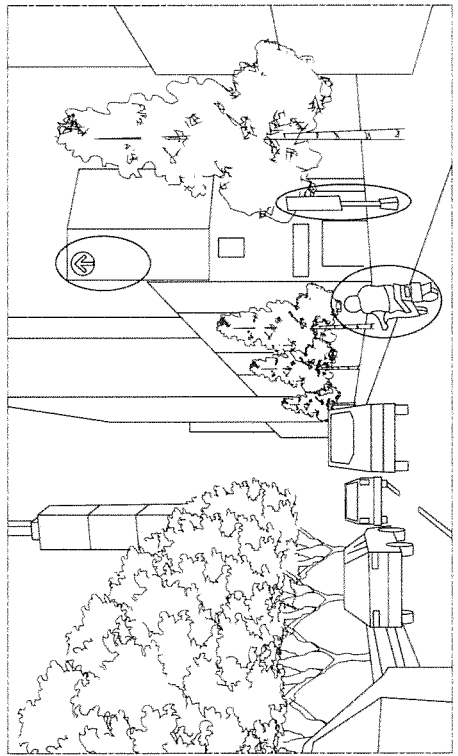
FIG. 13 illustrates another possible application of the present invention.
Figure 13:
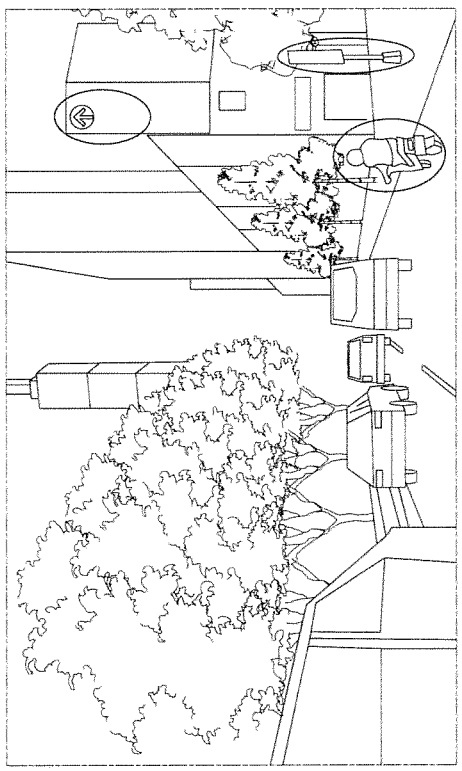
Figure 13:
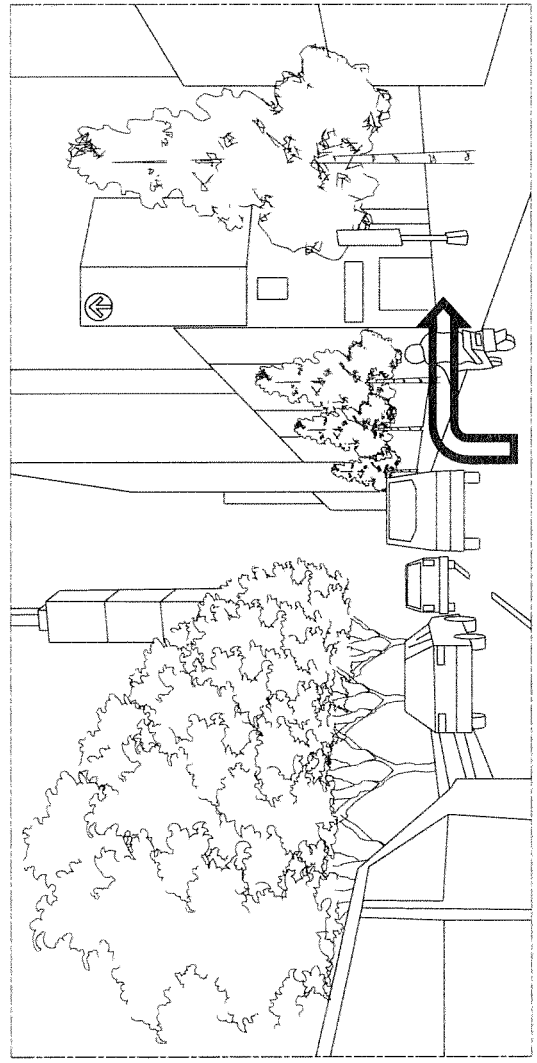

FIG. 13 illustrates another possible application of the present invention. In one embodiment, when the user wears the near-eye display system for navigation, the near-eye display system further comprises a positioning module for determining the position of the user relative to a reference coordinate system. In the meantime, the near-eye display system can utilize the aforementioned method to determine the positions of the objects and the direction to go in the surrounding of the user in real-time with respect to the user's point of view. The near-eye display system can superimpose images, such as arrows, to guide the user to maneuver in traffic in real-time to reach the designated location. The object recognition module can help identify potential hazards and obstacles to avoid potential hazards. The superimposed image will be at the same depth as the actual object, such as the allay to take turn, allowing the user to accurately perceive the correct direction to go.

Figure 14:
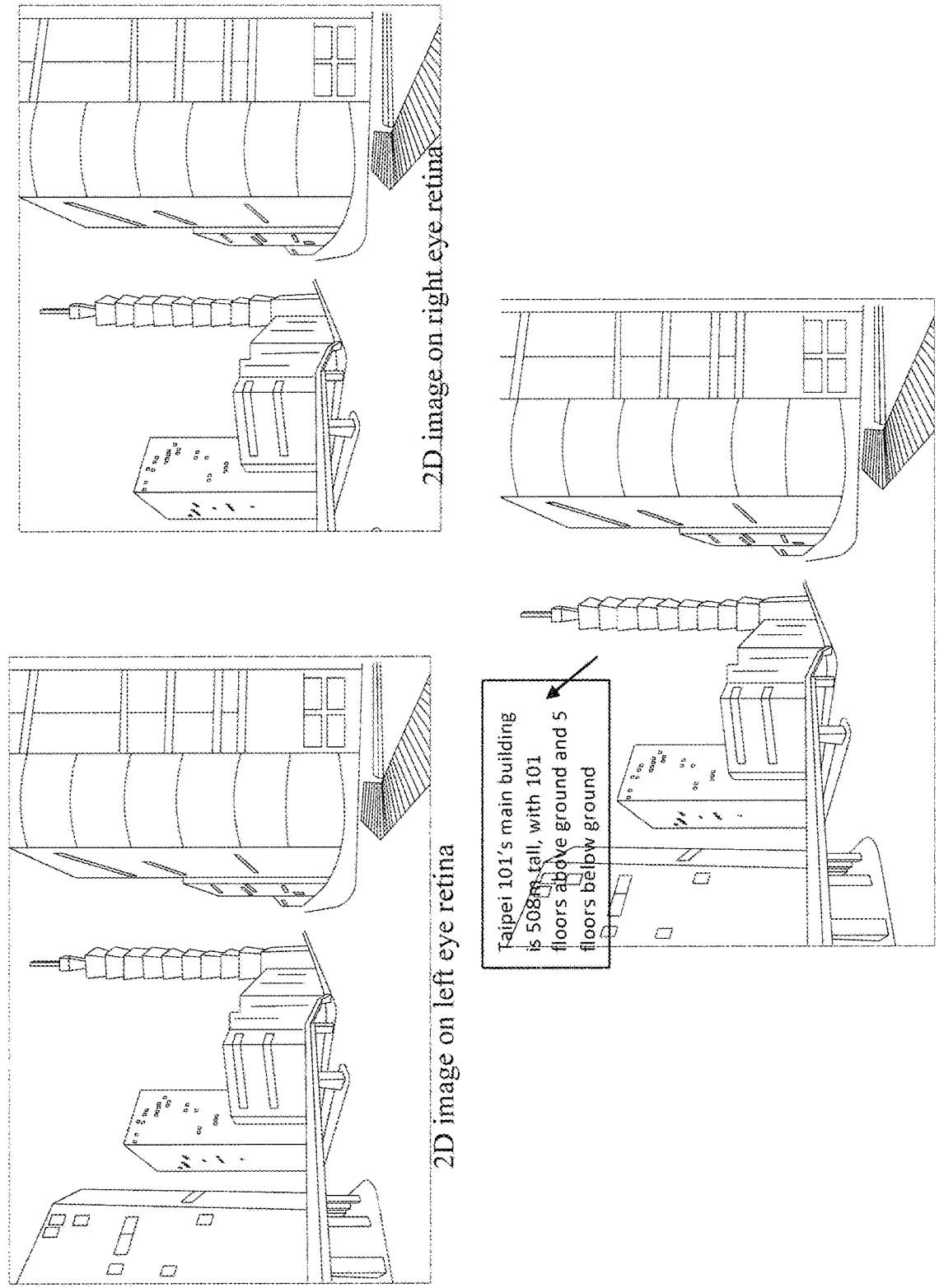
FIG. 14 illustrates another possible application of the present invention.
Figure 15:
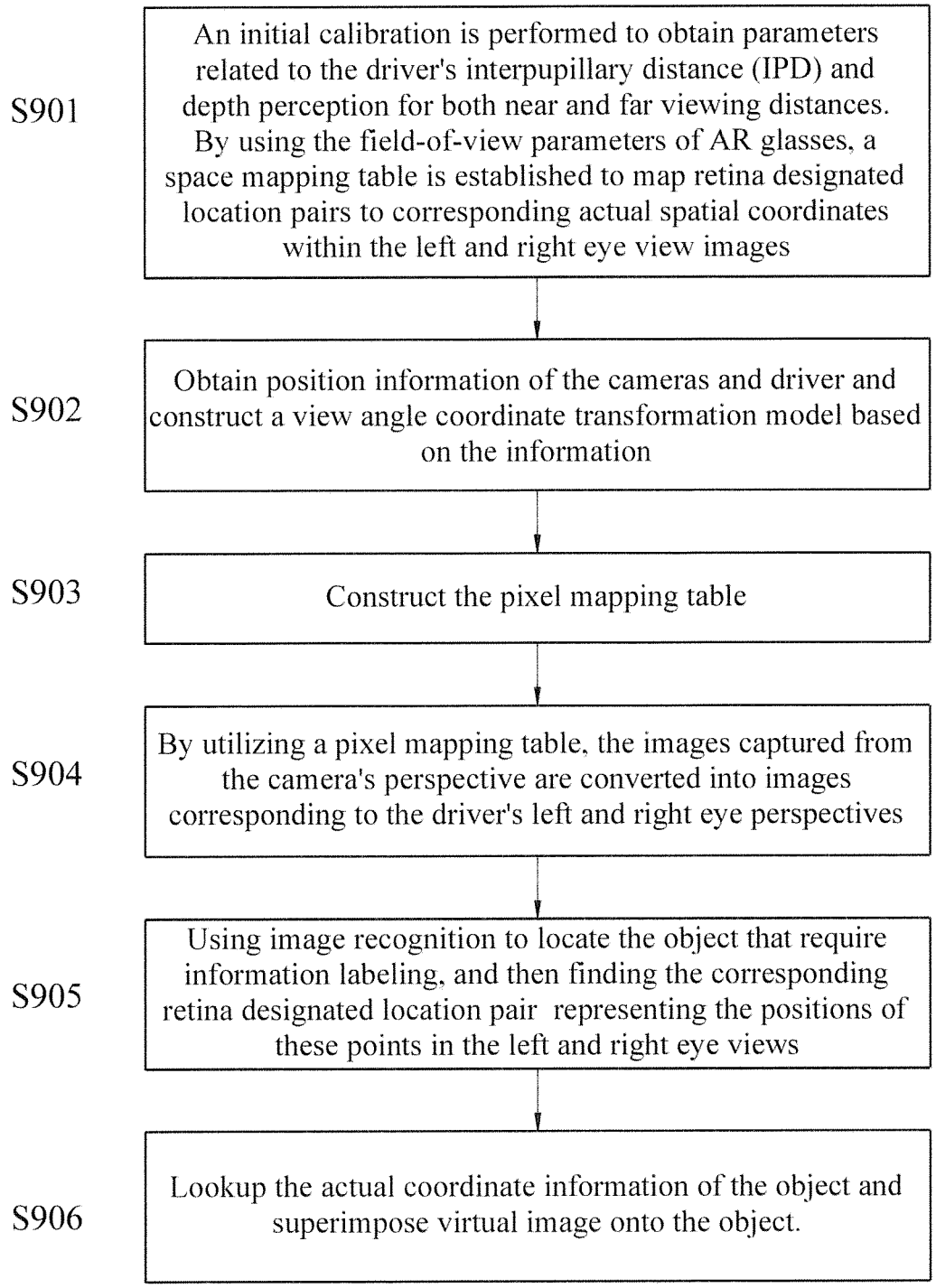
FIG. 15 illustrates the method of the present invention.

FIG. 14 illustrates another possible application of the present invention. In one embodiment, the eye-tracking device can determine the visual axes of the eyes' of the user, thereby accurately determine the object at which the user is looking. The near-eye display system can prompt information regarding the object. The image of the information is superimposed in proximity to the object.

Further in one embodiment, the plurality of imaging devices/cameras can be implemented on transportation vehicles such as cars. The driver can wear the near-eye display for receiving hazard warning, and navigation information . . . etc. mentioned before. In order to convert the 2D images captured by vehicle-mounted cameras into 2D images corresponding to the left and right eye perspectives of the driver, the spatial coordinates of each object as perceived by the driver are calculated by utilizing the position pairs of the objects within the driver's left and right eye fields of view (or retina).

Based on the specific embodiments described above, the present invention converts the two-dimensional videos captured by cameras installed in a vehicle into two-dimensional videos corresponding to the driver's left and right eye viewpoints. By knowing the retina designated location pair of each object in the driver's left and right eye field of view, the spatial coordinates of the object in the driver's perceived space can be obtained. As a result, virtual images can be superimposed on the real environment seen by the driver in real-time and accurately. The following is a brief description of the general process of the foregoing examples:

Step S901: An initial calibration is performed to obtain parameters related to the driver's interpupillary distance (IPD) and depth perception for both near and far viewing distances. By using the field-of-view parameters of AR glasses, a viewer's space mapping table is established to map retina designated location pairs to corresponding actual spatial coordinates (e.g., using the midpoint between the eyes of the viewer as the origin) within the left and right eye view images;

Step S902: Obtain position information of the cameras and driver and construct a view angle coordinate transformation model based on the information;

Step S903: Construct the pixel mapping table;

Step S904: By utilizing a pixel mapping table, the images captured from the camera's perspective are converted into images corresponding to the driver's left and right eye perspectives;

Step S905: Using image recognition to locate the object that require information labeling, and then finding the corresponding retina designated location pair representing the positions of these points in the left and right eye views; and Step S906: Lookup the actual coordinate information of the object from a mapping table (viewer's space mapping table) which contains the relationship between bitmap unit pairs and the corresponding 3D coordinate and superimpose virtual image onto the object.

The foregoing description of embodiments is provided to enable any person skilled in the art to make and use the subject matter. The method described herein can be performed in any orders. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A near-eye display system, comprising:
a first imaging device and a second imaging device, for respectively capturing a first image and a second image of a surrounding environment, the first image device and the second imaging device being provided at different spatial locations, wherein the first image and the second image comprise an image of an a real object, a first spatial coordinate of the real object in real space is determined based on bitmap unit pair receiving image of the real object, the bitmap unit pair corresponds to at least two positions respectively on image sensors of the first imaging device and the second imaging device; and
a near-eye display, comprising at least a first emitter and a second emitter for respectively emitting a first collimated light signal and a second collimated light signal, the first collimated light signal and the second collimated light signal being respectively emitted toward a right eye and a left eye to a retina designated location pair selected to render a binocular pixel at a second spatial coordinate in real space, wherein the retina designated location pair is related to specific location on a left retina of the left eye and specific location on a right retina of the right eye and is associated with the second spatial coordinate in real space,
wherein images of each portion of the real object are received by a bitmap unit pair which corresponds to different first spatial coordinate, the near-eye display renders a virtual image having a plurality of binocular pixels by emitting a plurality of first collimated light signals and a plurality of second collimated light signals to different retina designated location pairs.

2. The system of claim 1 wherein the bitmap unit pair is mapped to the retina designated location pair based on a relative position of the user to the first imaging device and the second imaging device.

3. The system of claim 1, wherein the retina designated location pair comprises information of a pair of specific horizontal locations and vertical locations on the left retina and the right retina.

4. The system of claim 3, wherein the pair of specific horizontal locations is associated with a convergent angle.

5. The system of claim 4, wherein an intersection of optical path extensions of the first collimated light signal and the second collimated light signal is substantially the same as location of a portion of the real object.

6. The system of claim 1, wherein the first imaging device and the second imaging device are provided on a transportation vehicle.

7. The system of claim 1, wherein the first imaging device and the second imaging device are provided on the near-eye display.

8. The system of claim 1, further comprising an object recognition module, for identifying bitmap unit pair of the real object from the first image and the second image.

9. The system of claim 8, wherein the image of the real object is received by a plurality of bitmap unit pairs, each bitmap unit pair from the plurality of bitmap unit pairs corresponds to different portion of the real object and has different first spatial coordinates.

10. The system of claim 9, wherein the first image or the second image has different pixel density with respect to that of an image frame rendered by the first emitter or the second emitter, the first image or the second image is reproduced and rendered via the first emitter or the second emitter after pixel interpolation or pixel extrapolation.

11. The system of claim 1, where the first image or the second image is fully or partially reproduced by the near-eye display.

12. The system of claim 1, wherein when the user perceives the binocular pixel at a three-dimensional coordinate in real space, eyes of the user turn toward the three-dimensional coordinate such that the first collimated light signal and the second collimated light signal are received by area close to fovea of the eyes.

13. The system of claim 12, wherein when the user perceives the binocular pixel at a three-dimensional coordinate in real space, visual axes of the eyes are substantially aligned with light path extensions of the first collimated light signal and the second collimated light signal.

14. The system of claim 13, wherein a converging point of the visual axes are substantially the same as a converging point of the light path extensions of the first collimated light signal and the second collimated light signal.

15. The system of claim 13, wherein a converging point of the visual axes are substantially the same as a point of the real object.

16. An object positioning method, comprising:
- performing a first calibration to associate a bitmap unit pair from a first imaging device and a second imaging device with a spatial coordinate to construct a first mapping table, the first image device and the second imaging device being provided at different spatial locations;
- performing a second calibration to obtain parameters related to a user's interpupillary distance and convergent angle for both a relatively near viewing distance and a relatively far viewing distances to construct a second mapping table;
- constructing a third mapping table to map bitmap unit pair to retina designated location pairs based on perspective of the user;
- by the first imaging device and the second imaging device, respectively capturing a first image and a second image of a surrounding environment, wherein the first image and the second image comprise an image of a real object, a first spatial coordinate of the real object in real space is determined based on bitmap unit pair receiving the image of the real object, the bitmap unit pair corresponds to at least two positions respectively on image sensors of the first imaging device and the second imaging device;
- converting the image of the real object captured from the imaging devices' perspective into an image seen from the user's perspectives based on the third mapping table; and
- by a near-eye display, which comprises at least a first emitter and a second emitter, respectively emitting a first collimated light signal and a second collimated light signal, the first collimated light signal and the second collimated light signal being respectively emitted toward a right eye and a left eye of the user to the retina designated location pair selected based on the converted image to render a binocular pixel at a second spatial coordinate in real space, wherein the retina designated location pair is related to specific location on a left retina of the left eye and specific location on a right retina of the right eye and is associated with the second spatial coordinate in real space,
- wherein images of each portion of the real object are received by a bitmap unit pair which corresponds to different first spatial coordinate, the near-eye display renders a virtual image having a plurality of binocular pixels by emitting a plurality of first collimated light signals and a plurality of second collimated light signals to different retina designated location pairs.

17. The method of claim 16, further comprising a step of using an object recognition module to locate an image of a real object for converting images captured from the imaging device's perspective into images seen from the user's perspectives.

18. The method of claim 17, further comprising a step of obtaining coordinate of the real object and superimpose a virtual image onto the real object.

* * * * *